(12) United States Patent
Hundt

(10) Patent No.: US 11,268,008 B2
(45) Date of Patent: Mar. 8, 2022

(54) CURABLE COMPOSITION AND RESIN FOR TREATMENT OF A SUBTERRANEAN FORMATION

(71) Applicant: Halliburton Energy Services, Inc., Houston, TX (US)

(72) Inventor: Greg Robert Hundt, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/542,612

(22) Filed: Aug. 16, 2019

(65) Prior Publication Data

US 2019/0367795 A1 Dec. 5, 2019

Related U.S. Application Data

(62) Division of application No. 15/513,489, filed as application No. PCT/US2014/069548 on Dec. 10, 2014, now Pat. No. 10,428,260.

(51) Int. Cl.
| | |
|---|---|
| *C09K 8/42* | (2006.01) |
| *E21B 33/13* | (2006.01) |
| *C09K 8/508* | (2006.01) |
| *C09K 8/575* | (2006.01) |
| *C04B 24/28* | (2006.01) |
| *C04B 28/02* | (2006.01) |
| *C09K 8/035* | (2006.01) |
| *C09K 8/44* | (2006.01) |
| *C09K 8/467* | (2006.01) |

(Continued)

(52) U.S. Cl.
CPC .............. *C09K 8/42* (2013.01); *C04B 24/281* (2013.01); *C04B 24/42* (2013.01); *C04B 26/32* (2013.01); *C04B 28/02* (2013.01); *C09K 8/035* (2013.01); *C09K 8/44* (2013.01); *C09K 8/467* (2013.01); *C09K 8/5086* (2013.01); *C09K 8/5755* (2013.01); *C09K 8/62* (2013.01); *C09K 8/68* (2013.01); *C09K 8/805* (2013.01); *E21B 33/13* (2013.01); *E21B 43/267* (2013.01); *C04B 2103/0045* (2013.01); *Y02W 30/91* (2015.05)

(58) Field of Classification Search
None
See application file for complete search history.

(56) References Cited

U.S. PATENT DOCUMENTS

| | | | | |
|---|---|---|---|---|
| 3,954,694 A | * | 5/1976 | Hallstrom | .............. B24D 3/344 523/457 |
| 4,216,829 A | | 8/1980 | Murphey | |

(Continued)

FOREIGN PATENT DOCUMENTS

| | | |
|---|---|---|
| CA | 2245032 | 2/1999 |
| WO | 2010128271 A1 | 11/2010 |

*Primary Examiner* — Jeffrey D Washville
(74) *Attorney, Agent, or Firm* — Chamberlain Hrdlicka

(57) ABSTRACT

Various embodiments disclosed relate to a curable composition and resin for treatment of a subterranean formation. In various embodiments, the present invention provides a method of treating a subterranean formation. The method can include placing in a subterranean formation a curable composition. The curable composition can include an epoxy silane monomer, a hardener, and carrier fluid. The curable composition can include an epoxy monomer, an amine silane hardener, and carrier fluid. The method can also include curing the curable composition to form an epoxy silane resin.

18 Claims, 3 Drawing Sheets

(51) Int. Cl.
*C09K 8/62* (2006.01)
*C09K 8/80* (2006.01)
*C04B 24/42* (2006.01)
*C04B 26/32* (2006.01)
*C09K 8/68* (2006.01)
*E21B 43/267* (2006.01)
*C04B 103/00* (2006.01)

(56) References Cited

U.S. PATENT DOCUMENTS

| | | | |
|---|---|---|---|
| 4,665,988 A * | 5/1987 | Murphey | C09K 8/5751 |
| | | | 166/295 |
| 5,559,086 A | 9/1996 | Dewprashad | |
| 6,006,836 A | 12/1999 | Chatterji | |
| 6,069,117 A | 5/2000 | Onan | |
| 6,311,773 B1 | 11/2001 | Todd | |
| 2002/0156187 A1 | 10/2002 | Greene | |
| 2003/0188872 A1 | 10/2003 | Nguyen | |
| 2007/0213492 A1 | 9/2007 | Mowrer et al. | |
| 2011/0160101 A1 * | 6/2011 | Naderhoff | C09K 8/805 |
| | | | 507/220 |
| 2013/0158159 A1 | 6/2013 | Iyer et al. | |
| 2014/0357535 A1 | 12/2014 | Tang et al. | |
| 2016/0333259 A1 * | 11/2016 | Monastiriotis | C09K 8/805 |

\* cited by examiner

CURABLE COMPOSITION AND RESIN FOR TREATMENT OF A SUBTERRANEAN FORMATION

BACKGROUND

Epoxy resins have been used as alternatives to cement for remediation of wellbores. These resins flow easily into small cracks and microannuli, which are inaccessible to particle-based fluids, such as Portland cement. However, most epoxy resins have a low temperature threshold, which is typically related to the glass transition temperature ($T_g$) of the polymer. At temperatures over about 400° F., most epoxy resins are thermally unstable. As an alternative to epoxy resins, silicon resins have also been employed due to their temperature stability. However, silicon resins have poor adhesion properties, hindering their use for the remediation of wellbores.

Separately, epoxy resins and silicon resins often require the use of curing agents. Unfortunately, epoxy resin-curing agents and silicon resin-curing agents often interfere with each other making the simultaneous use of epoxy resins and silicon resins difficult. Further, the use of epoxy resin-curing agents and silicon resin-curing agents, such as platinum based curing agents, adds additional costs when epoxy resins or silicon resins are used.

Additionally, furan resins have been employed due to their extreme temperature stability. However, most furan resins are typically brittle and do not have desirable adhesion to casing.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
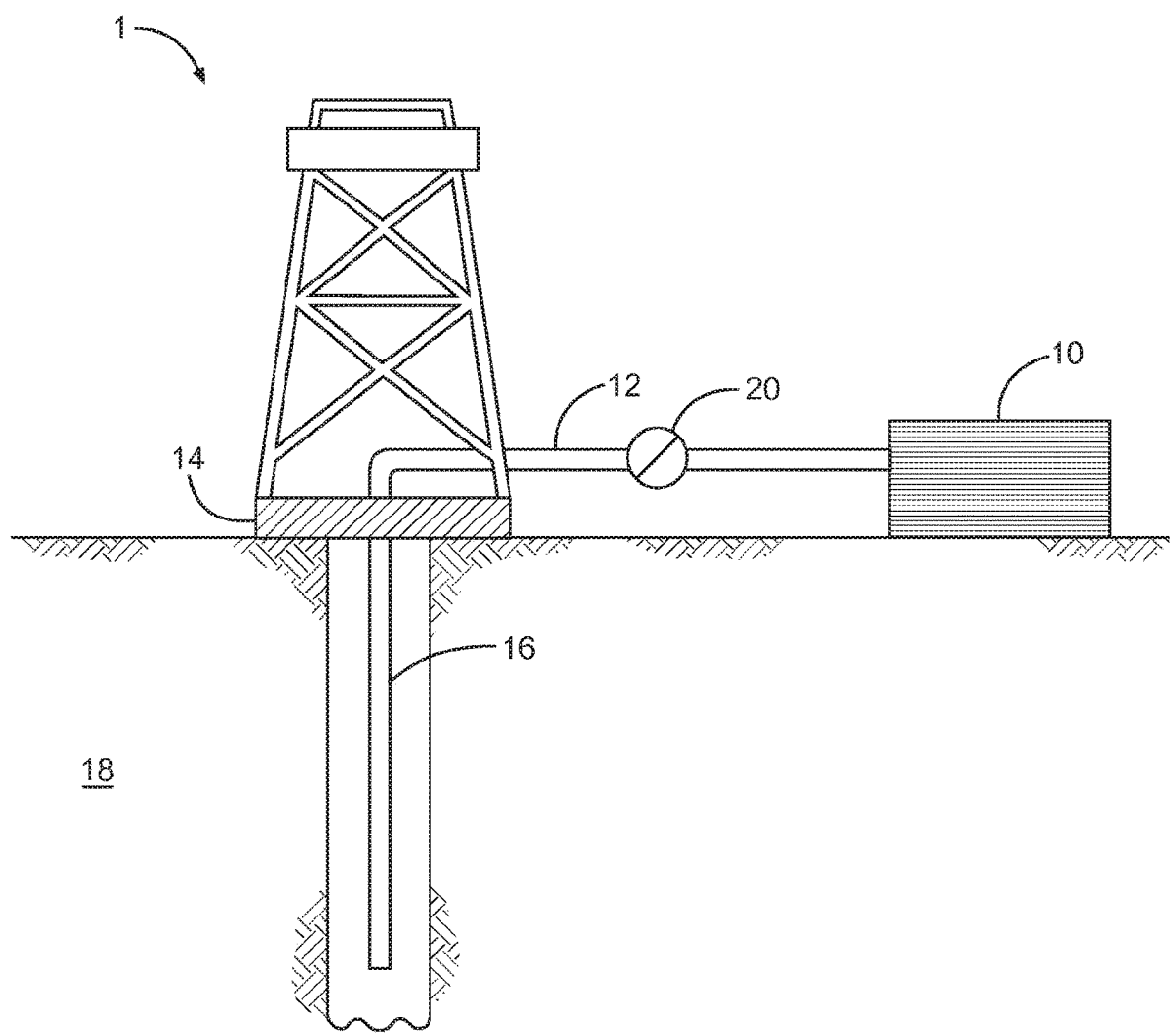
FIG. 1 illustrates a system or apparatus for delivering a composition to a subterranean formation, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods of manufacturing described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O) OR, N(R)C(O)R, N(R)C(S)R, N(R)C(O)N(R)$_2$, N(R)C(S)N (R)$_2$, N(COR)COR, N(OR)R, C(=NH)N(R)$_2$, C(O)N(OR) R, or C(=NOR)R, wherein R can be hydrogen or a carbon-based moiety, and wherein the carbon-based moiety can itself be further substituted; for example, R can be hydrogen, alkyl, acyl, cycloalkyl, aryl, aralkyl, heterocyclyl, heteroaryl, or heteroarylalkyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH (CH$_3$), —CH=C(CH$_3$)$_2$, —C(CH$_3$)=CH$_2$, —C(CH$_3$) =CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4- 2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl groups are alkenyl groups as defined herein in which a hydrogen or carbon bond of an alkyl group is replaced with a bond to an aryl group as defined herein.

The term "heterocyclyl" as used herein refers to aromatic and non-aromatic ring compounds containing three or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a C$_2$-heterocyclyl can be a 5-ring with two carbon atoms and three heteroatoms, a 6-ring with two carbon atoms and four heteroatoms and so forth. Likewise a $C_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "heterocyclylalkyl" as used herein refers to alkyl groups as defined herein in which a hydrogen or carbon bond of an alkyl group as defined herein is replaced with a bond to a heterocyclyl group as defined herein. Representative heterocyclyl alkyl groups include, but are not limited to, furan-2-yl methyl, furan-3-yl methyl, pyridine-3-yl methyl, tetrahydrofuran-2-yl ethyl, and indol-2-yl propyl.

The term "heteroarylalkyl" as used herein refers to alkyl groups as defined herein in which a hydrogen or carbon bond of an alkyl group is replaced with a bond to a heteroaryl group as defined herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula $N(group)_3$ wherein each group can independently be H or non-H, such as alkyl, aryl, and the like. Amines include but are not limited to R—$NH_2$, for example, alkylamines, arylamines, alkylarylamines; $R_2NH$ wherein each R is independently selected, such as dialkylamines, diarylamines, aralkylamines, heterocyclylamines and the like; and $R_3N$ wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —$NH_2$, —NHR, —$NR_2$, —$NR_3^+$, wherein each R is independently selected, and protonated forms of each, except for —$NR_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" as used herein refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Non-limiting examples of solvents are silicones, organic compounds, water, alcohols, ionic liquids, and supercritical fluids.

The term "silane" as used herein refers to a silicon atom with any suitable substituent thereon, including hydrocarbyl, hydrocarbyloxy, and hydroxy, such as silanols, siloxanes, and polysiloxanes and their reaction products and derivatives which can be "silane" mixtures.

The term "epoxy monomer" as used herein refers to molecules that include one or more epoxy functional group. Non-limiting examples of epoxy monomers include polyethylene glycol diglycidyl ether, cyclohexanedimethanol diglycidyl ether, trimethylolpropane tricglycidyl ether, and epoxy silane monomers.

Polyethylene glycol diglycidyl ether has the structure

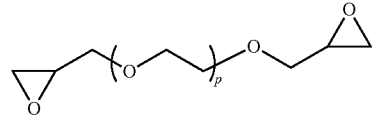

Cyclohexanedimethanol diglycidyl ether has the structure

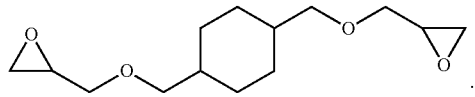 [SMILES: C1CC(COCC2CO2)CCC1COCC1CO1]

Trimethylolpropane triglycidyl ether has the structure

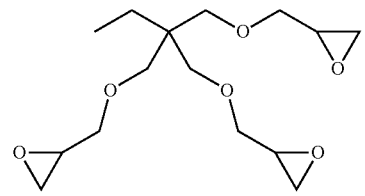

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "glass transition temperature" or "$T_g$," as used herein refers generally to the temperature below which a material is relatively hard and/or brittle.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment," "remediation," and "remediating" refers treatments designed to increase or maintain the production rate of a well, such as stimulation or clean-up treatments.

As used herein, the term "remedial treatment fluid" refers to fluids or slurries used downhole for remedial treatment of a well.

The term "consolidation," and grammatical equivalents, as used herein refers to controlling the undesirable production of sand, clays, and other fines from subterranean formations. Consolidation can bind together the sand, clays, and other fines in the subterranean formation while maintaining sufficient permeability to achieve viable production rates.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

In various embodiments, the present invention provides a method of treating a subterranean formation. The method includes placing in a subterranean formation a curable composition. In various embodiments, the curable composition includes an epoxy silane monomer, a hardener, and a carrier fluid. The method also includes curing the curable composition to form an epoxy silane resin.

In various embodiments, the present invention provides a method of treating a subterranean formation with a curable composition that includes an epoxy silane monomer, a hardener, and a carrier fluid. The curable composition includes an epoxy silane monomer having a structure chosen from

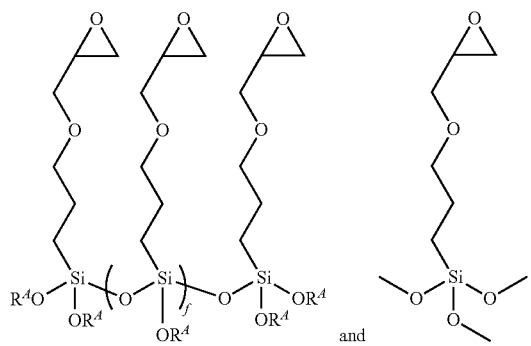

The variable f is about 0 to about 6. The variable $R^A$, at each occurrence, is independently chosen from —H and —CH$_3$, wherein the ratio of —H to —CH$_3$ is about 1 to 3 to about 3 to 1. The epoxy silane monomer is about 40 wt. % to about 80 wt. % of the curable composition. The curable composition includes a hardener having a structure chosen from

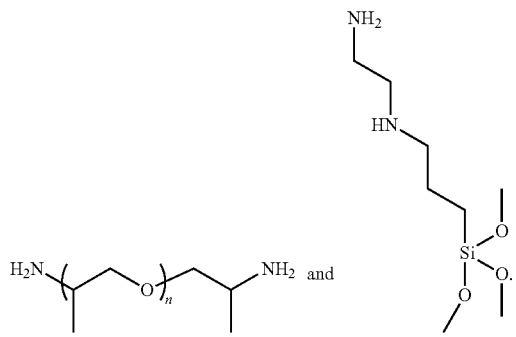

The variable n is about 1 to about 5. The hardener is about 5 wt. % to about 50 wt. % of the curable composition. The carrier fluid includes water and is about 1 wt. % to about 40 wt. % of the curable composition. The method also includes curing the curable composition to form an epoxy silane resin.

In various embodiments, the present invention provides a method for treating a subterranean formation with a curable composition that includes an epoxy monomer, an amine silane hardener, and a carrier fluid. The method also includes curing the curable composition to form an epoxy silane resin.

In various embodiments, the present invention provides a method of treating a subterranean formation with a curable composition that includes an epoxy monomer, an amine silane hardener, and a carrier fluid. The epoxy monomer is about 50 wt. % to about 70 wt. % of the curable composition. The amine silane hardener has the structure

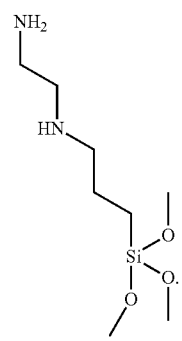

The amine silane hardener is about 20 wt. % to about 40 wt. % of the curable composition. The carrier fluid includes water and is about 1 wt. % to about 40 wt. % of the curable composition.

In various embodiments, the present invention provides a system including an epoxy silane resin cured reaction product of a curable composition including an epoxy silane monomer, a hardener, and a carrier fluid; and a subterranean formation including the resin therein.

In various embodiments, the present invention provides a system including an epoxy silane resin cured reaction product of a curable composition including an epoxy monomer, an amine silane hardener, and a carrier fluid, and a subterranean formation including the resin therein.

In various embodiments, the present invention provides a curable composition for treatment of a subterranean formation. The curable composition includes an epoxy silane monomer, a hardener, and a carrier fluid. The epoxy silane monomer has a structure chosen from

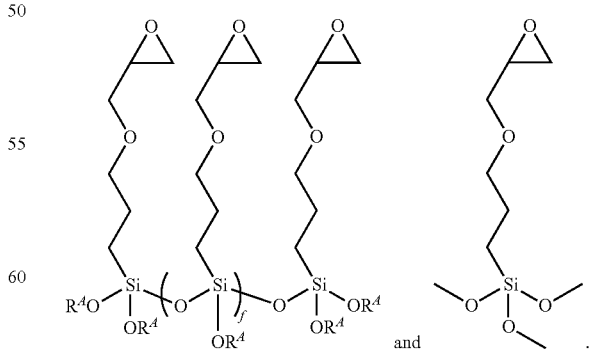

The variable f is about 0 to about 6. The variable $R^A$, at each occurrence, is independently chosen from —H and —CH$_3$, wherein the ratio of —H to —CH$_3$ is about 1 to 3 to about 3 to 1. The epoxy silane monomer is about 40 wt. % to about 80 wt. % of the curable composition. The hardener has a structure chosen from

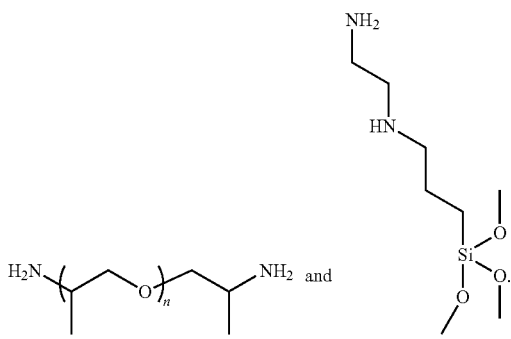

The variable n is about 1 to about 5. The hardener is about 5 wt. % to about 50 wt. % of the curable composition. The carrier fluid includes water and is about 1 wt. % to about 40 wt. % of the curable composition.

In various embodiments, the present invention provides a curable composition for treatment of a subterranean formation. The curable composition includes an epoxy monomer, an amine silane hardener and a carrier fluid. The epoxy monomer has the structure selected from

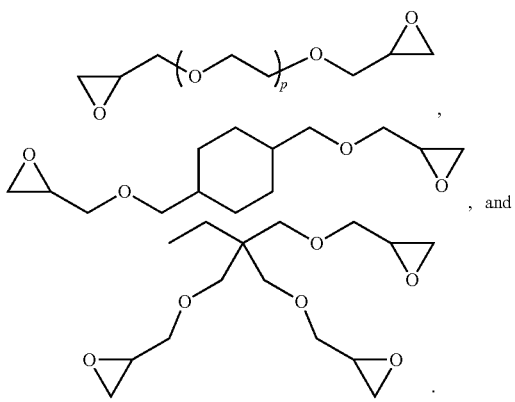

The variable p is about 1 to about 200. The epoxy monomer is about 50 wt. % to about 70 wt. % of the curable composition. The amine silane hardener has the structure

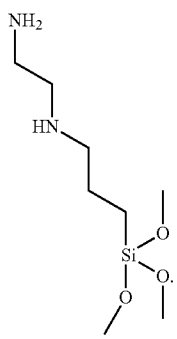

The amine silane hardener is about 20 wt. % to about 40 wt. % of the curable composition. The carrier fluid includes water and is about 1 wt. % to about 40 wt. % of the curable composition.

In various embodiments, the present invention provides for a method of preparing a curable composition for treatment of a subterranean formation. The method includes forming a curable composition including an epoxy silane monomer, a hardener, and a carrier fluid.

In various embodiments, the present invention provides for a method of preparing a curable composition for treatment of a subterranean formation. The method includes forming a curable composition including an epoxy monomer, an amine silane hardener, and a carrier fluid.

Various embodiments of the curable composition and method of using the same have certain advantages over other epoxy based compositions and methods of using the same, at least some of which are unexpected. In various embodiments, the curable composition can be used at higher temperatures than other epoxy compositions without sacrificing mechanical properties, adhesion properties, or stability. In various embodiments, the increased temperature tolerance of the curable composition can allow for deeper and hotter wells to be serviced. In various embodiments, by including both epoxide and silane functionalities on a single monomer, segregation of epoxy and silane domains during polymerization is reduced or eliminated, increasing homogeneity of the resulting polymer. In various embodiments, by including both amine and silane functionalities on a single monomer, segregation of amine and silane domains during polymerization is reduced or eliminated, increasing homogeneity of the resulting polymer. In various embodiments, by including both epoxide and silane functionalities on a single monomer, or, alternatively, amine and silane functionalities on a single monomer, the costs associated with transportation of the curable composition can be lower in comparison to those associated with transporting compositions in which silane containing compounds and epoxy containing compounds are shipped separately.

Method of Treating a Subterranean Formation.

In some embodiments, the present invention provides a method of treating a subterranean formation. The method can include placing in a subterranean formation a curable composition including an epoxy silane monomer, a hardener, and a carrier fluid in a subterranean formation and curing the curable composition to form an epoxy silane resin. Alternatively, the method can include placing in a subterranean formation a curable composition including an epoxy monomer, an amine silane hardener, and a carrier fluid in a subterranean formation and curing the curable composition to form an epoxy silane resin. The placing of the curable composition in the subterranean formation can include contacting the curable composition and any suitable part of the subterranean formation, or contacting the curable composition and a subterranean material, such as any suitable subterranean material. The subterranean formation can be any suitable subterranean formation. The obtaining or providing of the curable composition can occur at any suitable time and at any suitable location. The obtaining or providing of the curable composition can occur above the surface. The obtaining or providing of the curable composition can occur in the subterranean formation (e.g., downhole).

The term "epoxy silane resin" as used herein refers to the product formed from the curing of any of the curable compositions disclosed herein. Curing can include, but is not limited to, ring opening epoxide polymerization reactions as well as hydrolysis and condensation of silane groups to form siloxane and/or poly-siloxane groups.

In some examples, the placing of the curable composition in the subterranean formation includes contacting the curable composition with or placing the curable composition in at least one of a fracture, at least a part of an area surrounding a fracture, a flow pathway, an area surrounding a flow pathway, and an area desired to be fractured. The placing of the curable composition in the subterranean formation can be any suitable placing and can include any suitable contacting between the subterranean formation and the curable composition. The placing of the curable composition in the subterranean formation can include at least partially depositing the curable composition in a fracture, flow pathway, or area surrounding the same.

The method can include hydraulic fracturing, such as a method of hydraulic fracturing to generate a fracture or flow pathway. The placing of the curable composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only—with no proppant and with some viscosifier—such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the curable composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the curable composition is placed or contacted, or the curable composition is placed or contacted to an area surrounding the generated fracture or flow pathway.

In some embodiments, the method can be a method of remedial treatment, consolidation, stimulation, fracturing, spotting, clean-up, completion, applying a pill, acidizing, cementing, packing, spotting, plugging for abandonment, or a combination thereof.

In various embodiments, the curable composition includes a carrier fluid. In various embodiments, the carrier fluid is water. The water can be any suitable water. The water can include at least one of fresh water, brine, produced water, flowback water, brackish water, and sea water. The water can serve to aid in the hydrolysis and condensation of silane groups to form siloxane and/or poly-siloxane groups. In some embodiments, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), and an aliphatic hydrocarbon (e.g., cyclohexanone, hexane). In some embodiments, the fluid can form about 0.001 wt. % to about 99.999 wt. %, about 1% to about 40%, about 5% to about 30%, about 10% to about 20%, about 11% to about 19%, about 12% to about 18%, about 13% to about 17%, or about 14% to about 16% of the curable composition, or a mixture including the same, or about 0.001 wt. % or less, 0.01 wt. %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt. % or more.

In various embodiments, the method can include curing the curable composition to form an epoxy silane resin. The curing of the curable composition to form an epoxy silane resin can include ring opening epoxide polymerization reactions via reaction of the hardener with the epoxy silane monomer or epoxy monomer. The curing of the curable composition to form an epoxy silane resin can include the hydrolysis and condensation of silane groups to form siloxane and/or polysiloxane groups. The curing of the curable composition to form an epoxy silane resin can include ring opening epoxide polymerization reactions via reaction of the hardener with the epoxy silane monomer or epoxy monomer as well as hydrolysis and condensation of silane groups to form siloxane and/or polysiloxane groups. In various embodiments, the curing occurs at least partially above-surface (e.g., before the placing of the curable composition in the subterranean formation). In some embodiments, the curing occurs at least partially in the subterranean formation (e.g., at least one of during and after the placing of the curable composition in the subterranean formation).

In various embodiments, the epoxy silane resin has a degradation onset of about 300° F. to about 800° F., about 300° F. to about 700° F., about 450° F. to about 650° F., or about 300° F. or less, or about 320° F., 340, 360, 380, 400, 420, 440, 460, 480, 500, 550, 600, 650, 700, 750, or about 800° F. or more.

In various embodiments, the epoxy silane resin has a peak degradation temperature of about 550° F. to about 850° F., about 600° F. to about 800° F., about 625° F. to about 765° F., or about 300° F. or less, or about 320° F., 340, 360, 380, 400, 420, 440, 460, 480, 500, 550, 600, 650, 700, 750, 800, 850, 900, or about 950° F. or more.

In some embodiments, the epoxy silane resin is substantially homogeneous. In some embodiments the ratio of epoxy functional groups to silane functional groups in the epoxy silane resin is about 1 to 1, 1 to 1.1, 1 to 1.2, 1 to 1.3, 1 to 1.4, 1 to 1.6, 1 to 1.8, 1 to 2, 1 to 2.5, 1 to 3, 1 to 4, 1 to 5, 1 to 6, 1 to 7, 1 to 8, 1 to 10, 1 to 15, 1 to 20, 1 to 30, 1 to 40, 1 to 50, 1 to 60, 1 to 100, 1 to 200, 1 to 300, 1 to 400, 1 to 500, 1 to 600, 1 to 700, 1 to 800, 1 to 900, or less than about 1 to 1000. In some embodiments the epoxy to silane ratio in the epoxy silane resin is about 1.1 to 1, 1.2 to 1, 1.3 to 1.4 to 1, 1.6 to 1, 1.8 to 1, 2 to 1, 2.5 to 1, 3 to 1, 4 to 1, 5 to 1, 6 to 1, 7 to 1, 8 to 1, 9 to 1, 10 to 1, 15 to 1, 20 to 1, 30 to 1, 40 to 1, 50 to 1, 60 to 1, 70 to 1, 80 to 1, 90 to 1, 100 to 1, 200 to 1, 300 to 1, 400 to 1, 500 to 1, 600 to 1, 700 to 1, 800 to 1, 900 to 1 or greater than about 1000 to 1.

Epoxy Silane Monomer.

In various embodiments, the curable composition includes an epoxy silane monomer. The epoxy silane monomer can form any suitable proportion of the curable composition, so long as the curable composition can be used as described herein. For example, the epoxy silane monomer can be about 40 wt. % to about 85 wt. %, about 50 wt. % to about 75 wt. %, about 55 wt. % to about 70 wt. %, about 60 wt. % to about 65 wt. %, at least 5 wt. %, or about 5, 10, 15, 20, 25, 30, 35, 40, 45, 50, 55, 60, 65, 70, 75, 80, or about 85% wt. or more of the curable composition.

The term "epoxy silane monomer" as used herein refers to a molecule that contains both an epoxy functional group and a silane functional group. Non-limiting examples of epoxy silane monomers are Coatosil® MP200 and Silquest® A-187.

Coatosil® MP200 has the structure:

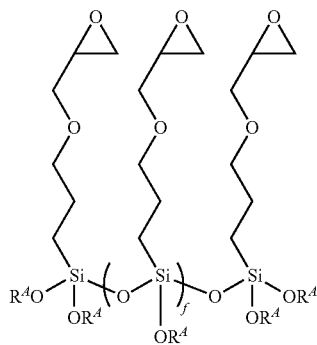

The variable f is about 2. The variable $R^A$, at each occurrence, is either —H or —$CH_3$ and the ratio of —H to —$CH_3$ is about 1 to 1.

Silquest® A-187 has the structure:

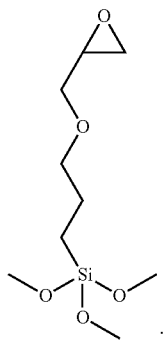

In some examples, the epoxy silane monomer can have the structure:

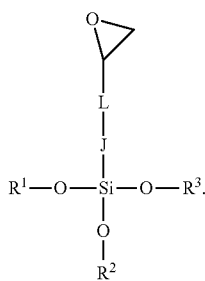

At each occurrence, $R^1$ and $R^2$ can each independently be chosen from —H and substituted or unsubstituted ($C_1$-$C_{10}$) hydrocarbyl. The variable $R^3$ can be independently selected from —H, substituted or unsubstituted ($C_1$-$C_{10}$)hydrocarbyl, and the structure:

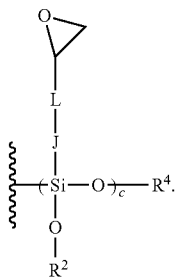

The variable $R^4$ can be independently be chosen from —H and substituted or unsubstituted ($C_1$-$C_{10}$)hydrocarbyl. At each occurrence, J can be independently selected from a bond and a substituted or substituted ($C_1$-$C_5$)hydrocarbylene. At each occurrence, L can be independently chosen from substituted or unsubstituted ($C_1$-$C_{10}$)hydrocarbylene that can be interrupted or terminated by 0, 1, 2, or 3 groups independently chosen from —O— and —S—. The variable c can be about 0 to about 10.

At each occurrence, $R^1$ and $R^2$ can each be independently chosen from —H and substituted or unsubstituted ($C_1$-$C_{10}$) hydrocarbyl. At each occurrence, $R^1$ and $R^2$ can each independently be chosen from —H and ($C_1$-$C_{10}$)alkyl. At each occurrence, $R^1$ and $R^2$ can each independently be chosen from —H and ($C_1$-$C_5$)alkyl. At each occurrence, $R^1$ and $R^2$ can each independently be chosen from —H and methyl.

The variable $R^3$ can be independently selected from —H, substituted or unsubstituted ($C_1$-$C_{10}$)hydrocarbyl, and the structure:

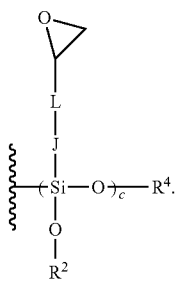

The variable $R^4$ can independently be chosen from —H and substituted or unsubstituted ($C_1$-$C_{10}$)hydrocarbyl. At each occurrence, J can be independently selected from a bond and a substituted or substituted ($C_1$-$C_5$)hydrocarbylene. At each occurrence, L can be independently chosen from a substituted or unsubstituted ($C_1$-$C_{10}$)hydrocarbylene that can be interrupted or terminated by 0, 1, 2, or 3 groups independently chosen from —O— and —S—. The variable c can be about 0 to about 10.

The variable $R^4$ can independently be chosen from —H and substituted or unsubstituted ($C_1$-$C_{10}$)hydrocarbyl. The variable $R^4$ can independently be chosen from —H and ($C_1$-$C_{10}$)alkyl. The variable $R^4$ can independently be chosen from —H and ($C_1$-$C_5$)alkyl. The variable $R^4$ can independently be chosen from —H and methyl.

The variable J can independently be chosen from a bond and a substituted or substituted $(C_1-C_5)$hydrocarbylene. The variable J can be independently chosen from a bond and a $(C_1-C_5)$alkylene. The variable J can be propylene. The variable J can be a bond.

The variable L can independently be chosen from a substituted or unsubstituted $(C_1-C_{10})$hydrocarbylene that can be interrupted or terminated by 0, 1, 2, or 3 groups independently chosen from —O— and —S—. The variable L can independently be chosen from a $(C_1-C_5)$alkylene, —OCH$_2$(CH$_2$)$_3$CH$_2$—, —OCH$_2$(CH$_2$)$_2$CH$_2$—, —OCH$_2$CH$_2$CH$_2$—, —OCH$_2$CH$_2$—, and —OCH$_2$—. The variable L can independently be chosen from —OCH$_2$(CH$_2$)$_3$CH$_2$—, —OCH$_2$(CH$_2$)2CH$_2$—, —OCH$_2$CH$_2$CH$_2$—, —OCH$_2$CH$_2$—, and —OCH$_2$—. The variable L, at each occurrence, can be —OCH$_2$—.

The variable c can be about 0 to about 10, or about 0 to about 3, or about 0, 1, 2, 3, 4, 5, 6, 7, 8, 9, or about 10 or more.

In some examples $R^3$ can be the structure

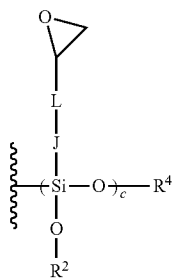

wherein at each occurrence, $R^2$ can be independently chosen from —H and $(C_1-C_{10})$alkyl, $R^4$ can be independently chosen from —H and $(C_1-C_{10})$alkyl, at each occurrence, J can be independently chosen from a from a bond and a $(C_1-C_5)$alkylene, at each occurrence, L can be independently chosen from —OCH$_2$(CH$_2$)$_3$CH$_2$—, —OCH$_2$(CH$_2$)$_2$CH$_2$—, —OCH$_2$CH$_2$CH$_2$—, —OCH$_2$CH$_2$—, and —OCH$_2$—, and c can be about 0 to about 5.

In some examples $R^3$ can be the structure

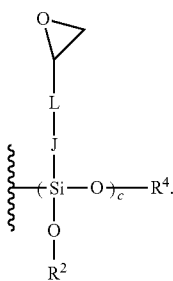

wherein at each occurrence, $R^2$ can be independently chosen from —H and methyl, $R^4$ can be independently chosen from —H and methyl, at each occurrence J can be —CH$_2$CH$_2$CH$_2$—, at each occurrence, L can be —OCH$_2$—, and c can be about 0 to about 3.

In some examples, the epoxy silane monomer can be a structure chosen from

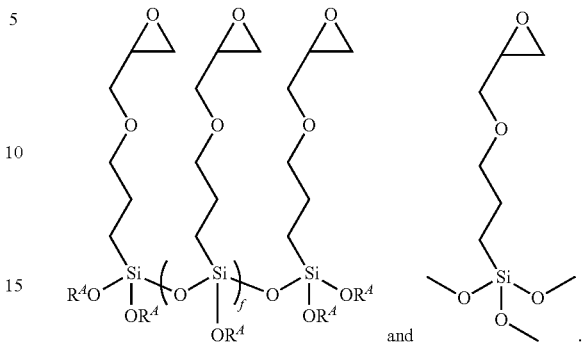

The variable f can be about 0 to about 100, about 0 to about 90, about 0 to about 80, about 0 to about 70, about 0 to about 60, about 0 to about 50, about 0 to about 40, about 0 to about 30, about 0 to about 20, about 0 to about 15 about 0 to 10, about 0 to about 8, about 0 to about 6, about 0 to about 4, about 0 to about 2 or about 0, 1, 2, 3, 4, 5, 6, 7, 8, 9, 10, 15, 20, 30, 40, 50, 60, 70, 80, 90, or 100. The variable $R^A$, at each occurrence, is independently chosen from —H and —CH$_3$. The ratio of —H to —CH$_3$ for the variable $R^A$ can be about 1 to 3 to about 3 to 1. The ratio of —H to —CH$_3$ for the variable $R^A$ can be about 1 to 100 to about 100 to 1, about 80 to 1 to about 1 to 80, about 1 to 60 to about 60 to 1, about 1 to 40 to about 40 to 1, about 1 to 20 to about 20 to 1, about 1 to 15 to about 15 to 1, about 1 to 10 to about 10 to 1, about 1 to 8 to about 8 to 1, about 1 to 6 to about 6 to 1, about 1 to 5 to about 5 to 1, about 1 to 4 to about 4 to 1, about 1 to 3 to about 3 to 1, about 1 to 2 to about 2 to 1, or about 1 to 1. In some embodiments, the variable $R^A$, at each occurrence, is —H. In some embodiments, the variable $R^A$, at each occurrence, is —CH$_3$.

Hardener.

The curable composition includes a hardener. The hardener can form any suitable proportion of the curable composition, so long as the curable composition can be used as described herein. For example, the hardener can be about 5 wt. % to about 50 wt. %, about 10 wt. % to about 40 wt. %, about 15 wt. % to about 35 wt. %, about 17 wt. % to about 25 wt. %, at least 5 wt. %, or about 5, 10, 15, 20, 25, 30, 35, 40, 45, or about 50 wt. % or more of the curable composition.

The term "hardener" as used herein refers a molecule capable of crosslinking epoxy silane monomers and/or epoxy monomers. In some embodiments, the crosslinking can result in polymerization and the formation of epoxy silane resins. Non-limiting examples of a hardener include amine silane hardeners, Jeffamine D230, and Jeffamine ED-600.

Jeffamine® D230 has the structure

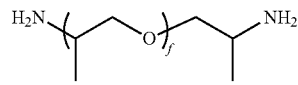

wherein the variable f has an average value of about 2.5.

Jeffamine® ED-600 has the structure

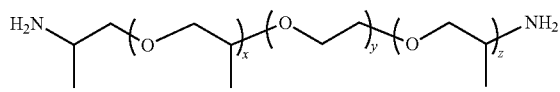

wherein y is about 9 and x+z has an average 3.6.

In some examples the hardener can be chosen from at least one primary or secondary amine. The hardener can be any suitable hardener that can react with the epoxy silane monomer to form an epoxy silane resin. The hardener can be an epoxide-reactive hardener. The hardener can include a nucleophilic group that can attack and open an epoxide, such as a primary or secondary amine. The hardener can be an amine-functional hardener, and can include at least one of an amine, an aromatic amine, an aliphatic amine, a cyclo-aliphatic amine, a polyamine, an amide, and a polyamide.

In some examples, the hardener can have the structure:

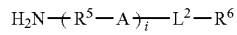

The variable $R^5$, at each occurrence, can be independently chosen from substituted or unsubstituted $(C_1-C_{10})$hydrocarbylene. The variable A, at each occurrence, can be independently chosen from —O— and —NH—. The variable $L^2$ can be independently chosen from substituted or unsubstituted $(C_1-C_{10})$hydrocarbylene. The variable $R^6$ can be chosen from —$NH_2$, —$Si(OR^7)_3$, and —OH. The variable $R^7$, at each occurrence, can be chosen from a $(C_1-C_5)$hydrocarbylene. The variable i can be about 1 to about 80.

The variable $R^5$, at each occurrence, can be independently chosen from substituted or unsubstituted $(C_1-C_{10})$hydrocarbylene. The variable $R^5$, at each occurrence, can be independently chosen from $(C_1-C_5)$alkylene. The variable $R^5$, at each occurrence, can be independently chosen from —$(CH_2)_2$— and —$CH(CH_3)CH_2$—.

The variable A, at each occurrence, can be independently chosen from —O— and —NH—.

The variable $L^2$ can be chosen from substituted or unsubstituted $(C_1-C_{10})$hydrocarbylene. The variable $L^2$ can be chosen from —$CH_2CH(CH_3)$— and —$(CH_2)_3$—.

The variable $R^6$ can be chosen from chosen from —$NH_2$, —$Si(OR^7)_3$, and —OH. The variable $R^7$, at each occurrence, can be independently chosen from a $(C_1-C_5)$hydrocarbyl. The variable $R^6$, at each occurrence, can be independently be chosen from —$Si(OR^7)_3$ and the variable $R^7$ at each occurrence can be independently chosen from —$CH_3$, —$CH_2CH_3$, and —$(CH_2)_2CH_3$. The variable $R^6$ can be —$Si(OCH_3)_3$.

The variable i can be about 1 to about 80, about 1 to about 70, about 1 to about 60, about 1 to about 50, about 1 to about 40, about 1 to about 30, about 1 to about 20, about 1 to about 10, about 1 to about 5, about 2.5, or about 1, or 1, 2, 3, 4, 5, 6, 7, 8, 9, 10, 11, 12, 13, 14, 15, 16, 17, 18, 19, 20, 22, 24, 26, 28, 30, 35, 40, 45, 50, 55, 60, 65, 70, 75, or 80 or more.

In some examples, the hardener can have a structure chosen from:

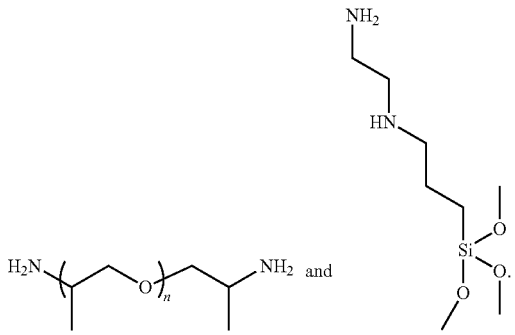

The variable n can be about 1 to about 80, about 65 to about 75, about 28 to about 38, about 4 to about 8, or about 1 to about 3, or 1, 2, 3, 4, 5, 6, 7, 8, 9, 10, 11, 12, 13, 14, 15, 16, 17, 18, 19, 20, 22, 24, 26, 28, 30, 35, 40, 45, 50, 55, 60, 65, 70, 75, or 80 or more.

In some examples, the hardener can have the structure:

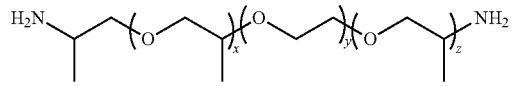

The variable y can be about 1 to about 45, about 1 to about 35, about 1 to about 25, about 1 to about 15, or about 1 to about 10, or 1, 2, 3, 4, 5, 6, 7, 8, 9, 10, 11, 12, 13, 14, 15, 16, 17, 18, 19, 20, 22, 24, 26, 28, 30, 35, 40, 45, 50, 55, 60, 65, 70, 75, or 80 or more. The variables x and z, when added together, can be about 1 to about 10, or 1, 2, 3, 4, 5, 6, 7, 8, 9, or 10 or more.

Epoxy Monomer.

In various embodiments, the curable composition includes an epoxy monomer. The epoxy monomer can form any suitable proportion of the curable composition, so long as the curable composition can be used as described herein. For example, the epoxy silane monomer can be about 40 wt. % to about 85 wt. %, about 50 wt. % to about 75 wt. %, about 55 wt. % to about 70 wt. %, about 60 wt. % to about 65 wt. %, at least 5 wt. %, or about 5, 10, 15, 20, 25, 30, 35, 40, 45, 50, 55, 60, 65, 70, 75, 80, or about 85% wt. or more of the curable composition.

In some examples, the epoxy monomer can be any monomer having one or more epoxy functional groups. In some examples, the epoxy monomer can be an epoxide substituted $(C_1-C_{10})$hydrocarbyl, wherein the $(C_1-C_{10})$hydrocarbyl can be independently substituted or unsubstituted. In some examples, the epoxy monomer can be an epoxide substituted $(C_1-C_{10})$hydrocarbylglycidyl ether, such as butyl glycidyl ether. In some examples, the hardenable resin includes a combination of an epoxide-substituted $(C_1-C_{10})$ hydrocarbyl compound and a polyepoxide-substituted mono- or poly($C_5-C_{20}$)aryl compound, such as a combination of butyl glycidyl ether and a diglycidyl ether of bisphenol A.

In some examples, the epoxy monomer can have a structure chosen from

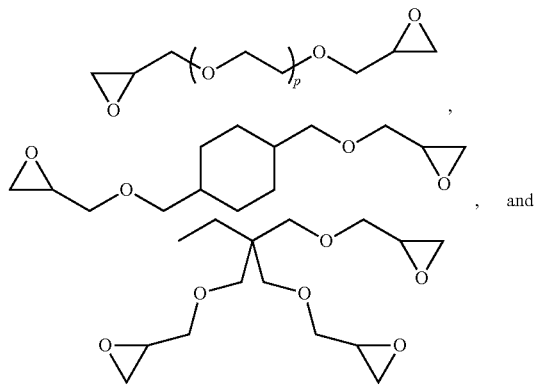

, and

The variable p can be about 1 to about 200, about 1 to about 150, about 1 to about 100, about 1 to about 50, about 1 to about 25, about 1 to 15, about 1 to 10, or about 1 to 5, or 1, 2, 3, 4, 5, 6, 7, 8, 9, 10, 11, 12, 13, 14, 15, 16, 17, 18, 19, 20, 22, 24, 26, 28, 30, 35, 40, 45, 50, 55, 60, 65, 70, 75, 80, 90, 100, 110, 120, 130, 140, 150, 160, 170, 180, 190, 200 or more.

Amine Silane Hardener

The curable composition includes an amine silane hardener. The amine silane hardener can form any suitable proportion of the curable composition, so long as the curable composition can be used as described herein. For example, the amine silane hardener can be about 5 wt. % to about 50 wt. %, about 10 wt. % to about 40 wt. %, about 15 wt. % to about 35 wt. %, about 17 wt. % to about 25 wt. %, at least 5 wt. %, or about 5 wt. % or less, or about 10 wt. %, 15, 20, 25, 30, 35, 40, 45, or about 50 wt. % or more of the curable composition.

The term "amine silane hardener" as used herein refers to a molecule that contains both a primary amine and silane functional groups. A non-limiting example of an amine silane hardener is Silquest® A-1120.

Silquest® A-1120 has the structure:

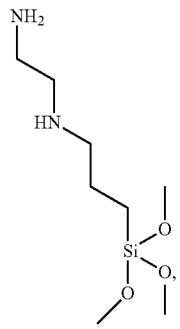

In some examples, the hardener can be chosen from a molecule that contains at least one primary or secondary amine and a silane. The hardener can be an epoxide-reactive hardener. The amine silane hardener can be an amine-functional hardener, and can include at least one of an amine, an aromatic amine, an aliphatic amine, a cyclo-aliphatic amine, a polyamine, an amide, and a polyamide.

In some examples, the amine silane hardener can have the structure:

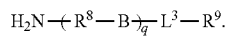

$$H_2N-(R^8-B)_q-L^3-R^9.$$

The variable $R^8$, at each occurrence, can be independently chosen from substituted or unsubstituted $(C_1-C_{10})$hydrocarbylene. The variable B, at each occurrence, can be independently chosen from —O— and —NH—. The variable $L^3$ can be independently chosen from substituted or unsubstituted $(C_1-C_{10})$hydrocarbylene. The variable $R^9$ can be —Si$(OR^{10})_3$. The variable $R^{10}$, at each occurrence, can be chosen from a $(C_1-C_5)$hydrocarbyl. The variable q can be about 1 to about 80.

The variable $R^8$, at each occurrence, can be independently chosen from substituted or unsubstituted $(C_1-C_{10})$hydrocarbylene. The variable $R^8$, at each occurrence, can be independently chosen from $(C_1-C_5)$alkylene. The variable $R^8$ can be —$(CH_2)_2$—.

The variable B, at each occurrence, can be independently chosen from —O—, and —NH—.

The variable $L^3$ can be chosen from substituted or unsubstituted $(C_1-C_{10})$hydrocarbylene. The variable $L^3$ can be —$(CH_2)_3$—.

The variable $R^9$ can be chosen from chosen from —$NH_2$, —Si$(OR^{10})_3$, and —OH. The variable $R^{10}$, at each occurrence, can be independently chosen from a $(C_1-C_5)$hydrocarbylene. The variable $R^9$, at each occurrence, can be independently be chosen from —Si$(OR^{10})_3$ and the variable $R^{10}$ at each occurrence can be independently chosen from —$CH_3$, —$CH_2CH_3$, and —$(CH_2)_2CH_3$. The variable $R^9$ can be —Si$(OCH_3)_3$.

In some examples, the amine silane hardener can have the structure

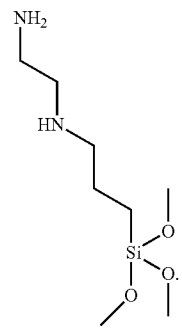

Other Components.

The curable composition including the curable composition, or a mixture including the curable composition, can include any suitable additional component in any suitable proportion, such that the curable composition, or mixture including the same, can be used as described herein.

In some embodiments, the curable composition or a cured product thereof further includes filler particles. The filler particles can include fillers, weighting agents, and combinations thereof. The filler particles can increase or decrease the density of the curable composition to achieve a proper density hierarchy for placement of the curable composition and to account for the pore pressure and fracture pressure of the surrounding formation. The filler particles can be chosen to modify the mechanical properties of the cured product of the curable composition or the fluid (rheological) properties of the liquid (uncured) curable composition. The filer particles can have the same density of curable composition so that the bulk density is not changed. The filler particle can include one of aluminum oxide, awaruite, barium carbonate, barium oxide, barite, calcium carbonate, calcium oxide, cenospheres, chromite, chromium oxide, copper, copper oxide, dolomite, galena, hematite, hollow glass microspheres, ilmenite, iron oxide, siderite, magnetite, magnesium oxide, manganese carbonate, manganese dioxide, manganese (IV) oxide, manganese oxide, manganese tetraoxide, manganese (II) oxide, manganese (III) oxide, molybdenum (IV) oxide, molybdenum oxide, molybdenum trioxide, Portland cement, pumice, pyrite, spherelite, silica, silver, tenorite, titania, titanium (II) oxide, titanium (III) oxide, titanium (IV) dioxide, zirconium oxide, zirconium silicate, zinc oxide, cement-kiln dust, unexpanded and expanded perlite, attapulgite, bentonite, zeolite, elastomers, sand, micronized polymers, waxes, polymer fibers, inorganic fibers and any combination thereof.

In some embodiments, the curable composition or a cured product thereof further includes a silane coupling agent. The silane coupling agent can be any suitable silane coupling agent. For example, the silane coupling agent can be a $(C_1-C_{30})$hydrocarbyl-substituted trimethoxysilane, wherein the hydrocarbyl group is substituted or unsubstituted. The silane coupling agent can be N-2-(aminoethyl)-3-aminopropyltrimethoxysilane, 3-glycidoxypropyltrimethoxysilane, or n-beta-(aminoethyl)-gamma-aminopropyltrimethoxysilane. Any suitable amount of the curable composition or a cured product thereof can be the silane coupling agent, such as about 0.001 wt. % to about 20 wt. %, or about 0.001 wt. % to about 3 wt. %, or about 0.001 wt. % or less, or about 0.01, 0.1, 1, 2, 3, 4, 5, 6, 8, 10, 12, 14, 16, 18, or about 20 wt. % or more.

In some embodiments, the curable composition includes one or more viscosifiers. The viscosifier can be any suitable viscosifier. The viscosifier can affect the viscosity of the curable composition or a solvent that contacts the curable composition at any suitable time and location. In some embodiments, the viscosifier provides an increased viscosity at least one of before injection into the subterranean formation, at the time of injection into the subterranean formation, during travel through a tubular disposed in a borehole, once the curable composition reaches a particular subterranean location, or some period of time after the curable composition reaches a particular subterranean location. In some embodiments, the viscosifier can be about 0.000,1 wt. % to about 10 wt. % of the curable composition or a mixture including the same, about 0.004 wt. % to about 0.01 wt. %, or about 0.000,1 wt. % or less, 0.000,5 wt. %, 0.001, 0.005, 0.01, 0.05, 0.1, 0.5, 1, 2, 3, 4, 5, 6, 7, 8, 9, or about 10 wt. % or more of the curable composition or a mixture including the same.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly$((C_2-C_{10})$alkene), wherein the $(C_2-C_{10})$ alkene is substituted or unsubstituted. The viscosifier can include at least one of poly(acrylic acid) or $(C_1-C_5)$alkyl esters thereof, poly(methacrylic acid) or $(C_1-C_5)$alkyl esters thereof, poly(vinyl acetate), poly(vinyl alcohol), poly(ethylene glycol), poly(vinyl pyrrolidone), polyacrylamide, poly(hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted $(C_2-C_{50})$hydrocarbyl having at least one aliphatic unsaturated C—C bond therein, and a substituted or unsubstituted $(C_2-C_{50})$alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted $(C_1-C_{20})$alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted $(C_1-C_{20})$alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted $(C_1-C_{20})$alkenoic substituted or unsubstituted $(C_1-C_{20})$alkanoic anhydride, a substituted or unsubstituted $(C_1-C_{20})$alkenoic substituted or unsubstituted $(C_1-C_{20})$alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—(C$_1$-C$_{10}$)alkenyl nitrogen containing substituted or unsubstituted (C$_1$-C$_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer.

The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the curable composition can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a (C$_1$-C$_{30}$)hydrocarbylboronic acid, a (C$_1$-C$_{30}$)hydrocarbyl ester of a (C$_1$-C$_{30}$)hydrocarbylboronic acid, a (C$_1$-C$_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a (C$_1$-C$_{20}$)alkylenebiacrylamide (e.g., methylenebisacrylamide), a poly((C$_1$-C$_{20}$)alkenyl)-substituted mono- or poly-(C$_1$-C$_{20}$)alkyl ether (e.g., pentaerythritol allyl ether), and a poly(C$_2$-C$_{20}$)alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000,01 wt. % to about 5 wt. % of the curable composition or a mixture including the same, about 0.001 wt. % to about 0.01 wt. %, or about 0.000,01 wt. % or less, or about 0.000,05 wt. %, 0.000,1, 0.000,5, 0.001, 0.005, 0.01, 0.05, 0.1, 0.5, 1, 2, 3, 4, or about 5 wt. % or more.

In some embodiments, the curable composition can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes a Na$^+$, K$^+$, Li$^+$, Zn$^+$, NH$_4^+$, Fe$^{2+}$, Fe$^{3+}$, Cu$^{1+}$, Ca$^{2+}$, Ca$^{2+}$, Mg$^{2+}$, Zn$^{2+}$, and an Al$^{3+}$ salt of a chloride, fluoride, bromide, phosphate, or sulfate ion. In some examples, the breaker can be an oxidative breaker or an enzymatic breaker. An oxidative breaker can be at least one of a Na$^+$, K$^+$, Li$^+$, Zn$^+$, NH$_4^+$, Fe$^{2+}$, Fe$^{3+}$, Cu$^{1+}$, Cu$^{2+}$, Ca$^{2+}$, Mg$^{2+}$, Zn$^{2+}$, and an Al$^{3+}$ salt of a persulfate, percarbonate, perborate, peroxide, perphosphosphate, permanganate, chlorite, or hyporchlorite ion. An enzymatic breaker can be at least one of an alpha or beta amylase, amyloglucosidase, oligoglucosidase, invertase, maltase, cellulase, hemicellulase, and mannanohydrolase. The breaker can be about 0.001 wt. % to about 30 wt. % of the curable composition or a mixture including the same, or about 0.01 wt. % to about 5 wt. %, or about 0.001 wt. % or less, or about 0.005 wt. %, 0.01, 0.05, 0.1, 0.5, 1, 2, 3, 4, 5, 6, 8, 10, 12, 14, 16, 18, 20, 22, 24, 26, 28, or about 30 wt. % or more.

The curable composition, or a mixture including the curable composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a C$_2$-C$_{40}$ fatty acid C$_1$-C$_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt. % to about 99.999 wt. % of the curable composition, or a mixture including the same, or about 0.001 wt. % or less, 0.01 wt. %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt. % or more.

The curable composition including the curable composition or a mixture including the same can include any suitable downhole fluid. The curable composition can be combined with any suitable downhole fluid before, during, or after the placement of the curable composition in the subterranean formation or the contacting of the curable composition and the subterranean material. In some examples, the curable composition is combined with a downhole fluid above the surface, and then the combined composition is placed in a subterranean formation or contacted with a subterranean material. In another example, the curable composition is injected into a subterranean formation to combine with a downhole fluid, and the combined composition is contacted with a subterranean material or is considered to be placed in the subterranean formation. The placement of the curable composition in the subterranean formation can include contacting the subterranean material and the mixture. Any suitable weight percent of the curable composition or of a mixture including the same that is placed in the subterranean formation or contacted with the subterranean material can be the downhole fluid, such as about 0.001 wt. % to about 99.999 wt. %, about 0.01 wt. % to about 99.99 wt. %, about 0.1 wt. % to about 99.9 wt. %, about 20 wt. % to about 90 wt. %, or about 0.001 wt. % or less, or about 0.01 wt. %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt. %, or about 99.999 wt. % or more of the curable composition or mixture including the same.

In some embodiments, the curable composition, or a mixture including the same, can include any suitable amount of any suitable material used in a downhole fluid. For example, the curable composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, cross-linking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the curable composition or a mixture including the same can include one or more additive components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQUITONE™ polymeric filtration agent and viscosifier; FACTANT™ emulsion stabilizer; LE SUPERMUL™, EZ MUL® NT, and FORTI-MUL® emulsifiers; DRIL TREAT® oil wetting agent for heavy fluids; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the curable composition or a mixture including the same can include one or more additive components such as: X-TEND® II, PAC™-R, PAC™-L, LIQUI-VIS® EP, BRINEDRIL-VIS™, BARAZAN®, N-VIS®, and AQUAGEL® viscosifiers; THERMA-CHEK®, N-DRIL™, N-DRIL™ HT PLUS, IMPERMEX®, FILTERCHEK™, DEXTRID®, CARBONOX®, and BARANEX® R filtration control agents; PERFORMATROL®, GEM™, EZ-MUD®, CLAY GRABBER®, CLAYSEAL®, CRYSTAL-DRIL®, and CLAY SYNC™ II shale stabilizers; NXS-LUBE™, EP MUDLUBE®, and DRIL-N-SLIDE™ lubricants; QUIK-THIN®, IRON-THIN™, and ENVIRO-THIN™ thinners; SOURSCAV™ scavenger; BARACOR® corrosion inhibitor; and WALL-NUT®, SWEEP-WATE®, STOPPIT™, PLUG-GIT®, BARACARB®, DUO-SQUEEZE®, BARO-FIBRE™, STEELSEAL®, and HYDRO-PLUG® lost circulation management materials. Any suitable proportion of the curable composition or mixture including the curable composition can include any optional component listed in this paragraph, such as about 0.001 wt. % to about 99.999 wt. %, about 0.01 wt. % to about 99.99 wt. %, about 0.1 wt. % to about 99.9 wt. %, about 20 to about 90 wt. %, or about 0.001 wt. % or less, or about 0.01 wt. %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt. %, or about 99.999 wt. % or more of the curable composition or mixture.

In various embodiments, the curable composition or mixture can include a proppant, an epoxy silane resin-coated proppant, resin-coated proppant, an encapsulated epoxy silane resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The curable composition or mixture can include any suitable amount of proppant, such as about 0.01 wt. % to about 99.99 wt. %, about 0.1 wt. % to about 80 wt. %, about 10 wt. % to about 60 wt. %, or about 0.01 wt. % or less, or about 0.1 wt. %, 1, 2, 3, 4, 5, 10, 15, 20, 30, 40, 50, 60, 70, 80, 85, 90, 91, 92, 93, 94, 95, 96, 97, 98, 99, about 99.9 wt. %, or about 99.99 wt. % or more.

System or Apparatus.

In various embodiments, the present invention provides a system. The system can be any suitable system that can use or that can be generated by use of an embodiment of the curable composition described herein in a subterranean formation, or that can perform or be generated by performance of a method for using the curable composition described herein. The system can include a composition including an embodiment of the curable composition described herein. In some embodiments the system can include an epoxy silane resin cured reaction product formed from an embodiment of the curable composition described herein. The system can also include a subterranean formation including the curable composition therein. In some embodiments, the curable composition in the system can also include a downhole fluid, or the system can include a mixture of the curable composition and downhole fluid. In some embodiments, the system can include a tubular, and a pump configured to pump the curable composition into the subterranean formation through the tubular.

Various embodiments provide systems and apparatus configured for delivering the curable composition described herein to a subterranean location and for using the curable composition therein, such as for a fracturing operation (e.g., pre-pad, pad, slurry, or finishing stages). In various embodiments, the system or apparatus can include a pump fluidly coupled to a tubular (e.g., any suitable type of oilfield pipe, such as pipeline, drill pipe, production tubing, and the like), with the tubular containing a composition including the curable composition described herein or a reaction product thereof (e.g., an epoxy silane cured reaction product thereof).

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the curable composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the curable composition to the high pressure pump. In such embodiments, the low pressure pump can "step up" the pressure of the curable composition before it reaches the high pressure pump.

In some embodiments, the systems or apparatuses described herein can further include a mixing tank that is upstream of the pump and in which the curable composition is formulated. In various embodiments, the pump (e.g., a low pressure pump, a high pressure pump, or a combination thereof) can convey the curable composition from the mixing tank or other source of the curable composition to the tubular. In other embodiments, however, the curable composition can be formulated offsite and transported to a worksite, in which case the curable composition can be introduced to the tubular via the pump directly from its shipping container (e.g., a truck, a railcar, a barge, or the like) or from a transport pipeline. In either case, the curable composition can be drawn into the pump, elevated to an appropriate pressure, and then introduced into the tubular for delivery to the subterranean formation.

FIG. 1 shows an illustrative schematic of systems and apparatuses that can deliver embodiments of the curable compositions of the present invention to a subterranean location, according to one or more embodiments. It should be noted that while FIG. 1 generally depicts a land-based system or apparatus, it is to be recognized that like systems and apparatuses can be operated in subsea locations as well. Embodiments of the present invention can have a different scale than that depicted in FIG. 1. As depicted in FIG. 1, system or apparatus 1 can include mixing tank 10, in which an embodiment of the curable composition can be formulated. The curable composition can be conveyed via line 12 to wellhead 14, where the curable composition enters tubular 16, with tubular 16 extending from wellhead 14 into subterranean formation 18. Upon being ejected from tubular 16, the curable composition can subsequently penetrate into subterranean formation 18. Pump 20 can be configured to raise the pressure of the curable composition to a desired degree before its introduction into tubular 16. It is to be recognized that system or apparatus 1 is merely exemplary in nature and various additional components can be present that have not necessarily been depicted in FIG. 1 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 1, at least part of the curable composition can, in some embodiments, flow back to wellhead 14 and exit subterranean formation 18. The curable composition that flows back can be substantially diminished in the concentration of one or more components of the curable composition originally placed in the subterranean composition. In some embodiments, the curable composition that has flowed back to wellhead 14 can subsequently be recovered, and in some examples reformulated, and recirculated to subterranean formation 18.

It is also to be recognized that the disclosed composition can also directly or indirectly affect the various downhole or subterranean equipment and tools that can come into contact with the curable composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 1.

Composition for Treatment of a Subterranean Formation.

Various embodiments provide a composition for treatment of a subterranean formation. The curable composition can be any suitable composition that can be used to perform an embodiment of the method for treatment of a subterranean formation described herein.

For example, the curable composition can include an epoxy silane monomer, a hardener, and a carrier fluid, as described herein. For example, the curable composition can include an epoxy monomer, an amine silane hardener, and a carrier fluid, as described herein Method for Preparing a Composition for Treatment of a Subterranean Formation.

In various embodiments, the present invention provides a method for preparing a composition for treatment of a subterranean formation. The method can be any suitable method that produces an embodiment of the curable composition described herein.

For example, the method can include forming a curable composition including an epoxy silane monomer, a hardener, and a carrier fluid, as described herein. For example, the method can include forming a curable composition including an epoxy monomer, an amine silane hardener, and a carrier fluid, as described herein.

EXAMPLES

Various embodiments of the present invention can be better understood by reference to the following Examples which are offered by way of illustration. The present invention is not limited to the Examples given herein.

Example 1. Preparation of Epoxy Silane Resins

Preparation of epoxy silane resins: The silane containing monomer was mixed with water for 60 minutes. The hardener was then added and stirred to produce a homogeneous solution. The samples were placed in molds and cured overnight at room temperature and then at 122° F. for an additional 24 hours. The resin cylinders were removed from their molds cured an additional 24 hours at 150° F. The epoxy silane resins prepared are samples 1-4 in Table 1.

Example 2. Preparation of Epoxy Resin Samples

The resin and hardener were stirred together for 60 minutes at room temperature. The samples were poured in molds and cured at room temperature overnight. The samples were cured for an additional 24 hours at 122° F. The resin cylinders were removed from their molds and cured an additional 24 hours at 150° F. The epoxy resins prepared for comparative testing are samples 4-7 in Table 1.

TABLE 1

Epoxy Silane Resins and Epoxy Resins.

| Sample | Epoxy | Epoxy (g) | Hardener | Hardener (g) | Water (g) |
|---|---|---|---|---|---|
| 1 | Coatosil ® MP200 | 10 | Jeffamine ® D230 | 3.4 | 0.9 |
| 2 | Silquest ® A-187 | 10 | Jeffamine ® D230 | 2.7 | 2.8 |
| 3 | Cyclohexanedimethanol diglycidyl ether | 10 | Silquest ® A-1120 | 5.8 | 1.4 |
| 4 | Silquest ® A-187 | 10 | Silquest ® A-1120 | 3.2 | 4.0 |
| 5 | Cyclohexanedimethanol diglycidyl ether | 20 | Jeffamine ® D230 | 9.0 | — |
| 6 | Polyethyleneglycol diglycidyl ether | 20 | Jeffamine ® D230 | 4.6 | — |
| 7 | Trimethylolpropane triglycidyl ether | 20 | Jeffamine ® D230 | 11.4 | — |

Example 3. Thermal Gravimetric Analysis (TGA)

The resin formulations shown in Table 1 were tested for thermal stability by TGA. TGA was performed as follows: A small piece of resin sample was placed in a platinum pan and placed in the TGA instrument. Under a nitrogen atmosphere, the temperature was increased from room temperature to 1000° C. at 10° C. per minute. The sample was held at 1000° C. for 2.5 minutes. The weight of the sample was continuously recorded throughout the experiment. The first derivative of the sample weight was calculated and the peak of the first derivative was taken as the peak degradation temperature (e.g., the temperature at which degradation weight loss is highest). The departure of the weight from its baseline is taken as the degradation onset. The difference between the initial sample weight and final sample weight is the total mass lost.

Figure 2:
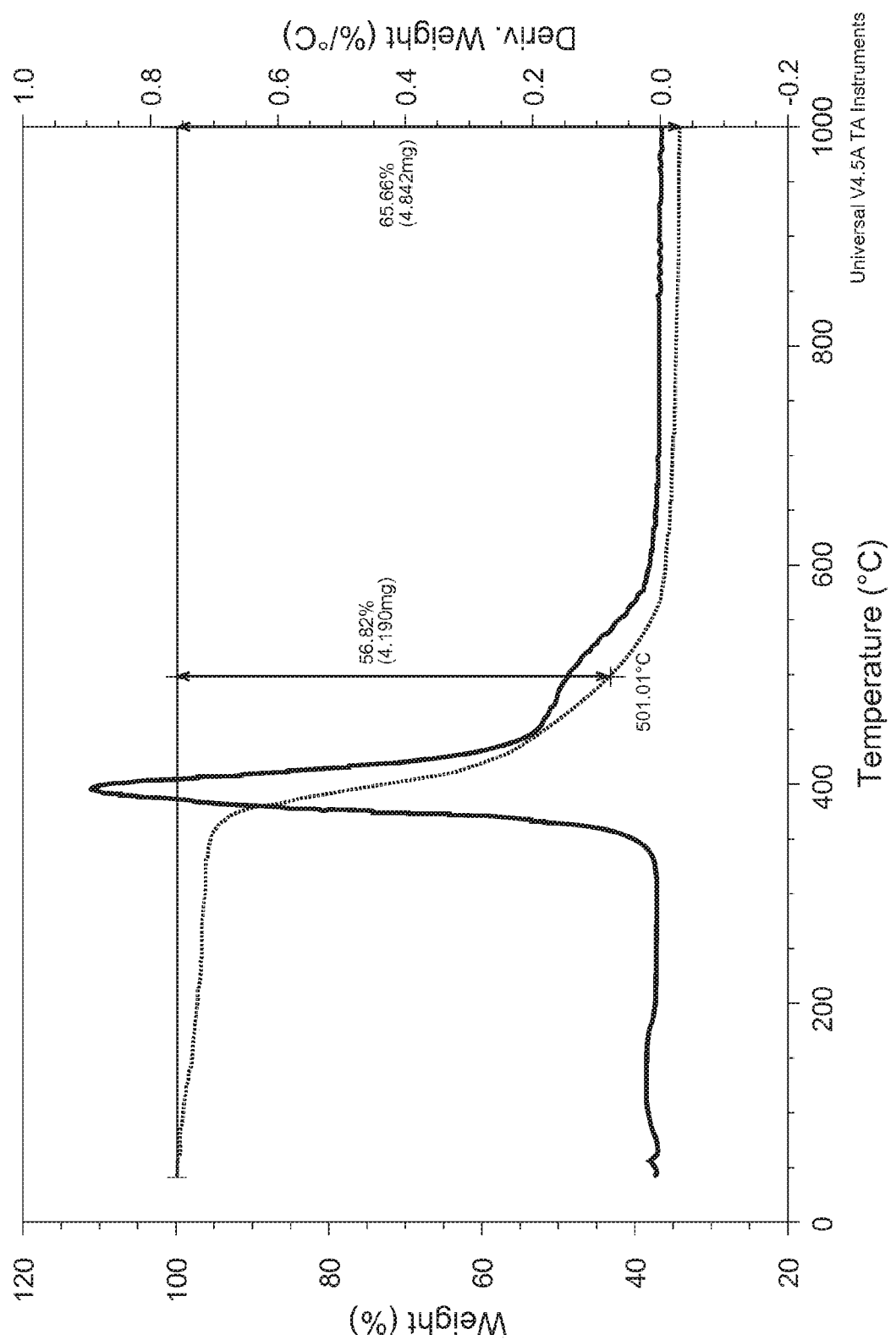
FIG. 2 illustrates a thermogram of an epoxy silane resin formed from Silquest® A-187 (10 g), Jeffamine® D230 (2.7 g) and water (2.8 g) (e.g., Sample 2 of Example 2) in accordance with various embodiments.
Figure 3:
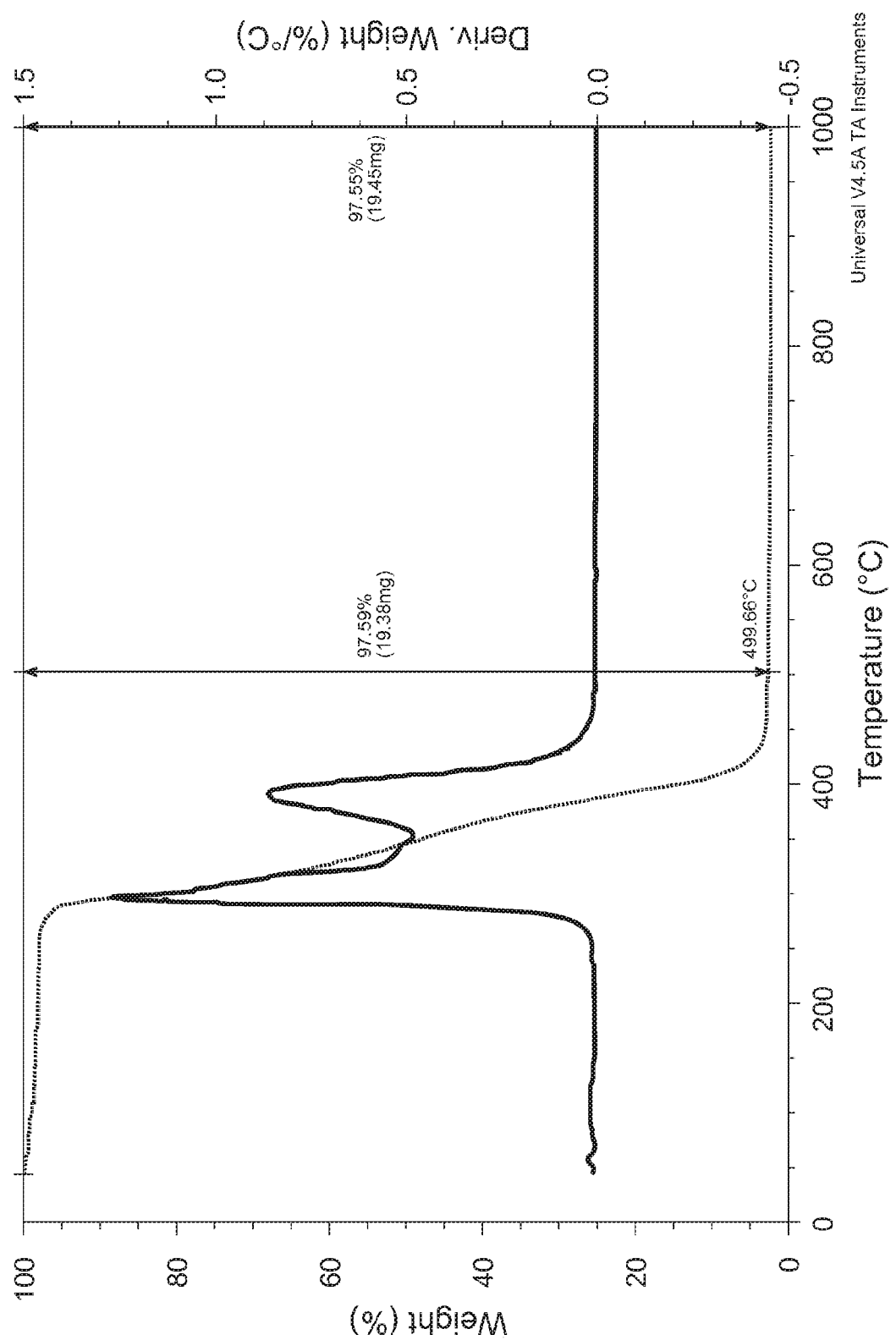
FIG. 3 illustrates a thermogram of an epoxy resin formed from cyclohexanedimethanol diglycidyl ether (20 g) and Jeffamine® D230 (9.0 g) (e.g., Sample 5 of Example 2).

The results of the TGA are shown in Table 2. Example thermograms are illustrated in FIG. 2 and FIG. 3. FIG. 2 illustrates a thermogram of Sample 2. FIG. 3 illustrates a thermogram of Sample 5. In all cases the peak degradation temperature of the epoxy silane resins was higher than for all of the epoxy resins. Further, in 3 out of 4 epoxy silane resins, the onset of degradation came at higher temperatures than for the epoxy resins. Finally, the total mass loss in the epoxy silane resins was less than that of the epoxy resins. These results show that epoxy silane resins are stable at higher temperatures than traditional epoxy resins. These resins are low viscosity and can be mixed in the same manner as epoxy resins. As such, epoxy silane resins can be employed in wells with BHS temperatures higher than those serviced with epoxy resins.

TABLE 2

TGA results.

| Sample | Resin Type | Degradation Onset (° F.) | Peak Degradation Temp. (° F.) | Total Mass Loss (%) |
|---|---|---|---|---|
| 1 | Epoxy silane | 628 | 734 | 66.8 |
| 2 | Epoxy silane | 646 | 752 | 65.7 |
| 3 | Epoxy silane | 509 | 635 | 78.7 |
| 4 | Epoxy silane | 601 | 761 | 55.2 |
| 5 | Epoxy | 493 | 563 | 97.9 |
| 6 | Epoxy | 516 | 554 | 98.7 |
| 7 | Epoxy | 477 | 626 | 97.7 |

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:
placing in a subterranean formation a curable composition comprising
an epoxy silane monomer;
a hardener; and
a carrier fluid; and
curing the curable composition to form an epoxy silane resin.

Embodiment 2 provides the method of Embodiment 1, wherein the curable composition is a composition for at least one of remediating, consolidating, cementing, and plugging for abandonment a subterranean formation.

Embodiment 3 provides the method of any one of Embodiments 1-2, wherein the carrier fluid comprises water.

Embodiment 4 provides the method of any one of Embodiments 1-3, wherein about 1 wt. % to about 40 wt. % of the curable composition is the carrier fluid.

Embodiment 5 provides the method of any one of Embodiments 1-4, wherein about 5 wt. % to about 25 wt. % of the curable composition is the carrier fluid.

Embodiment 6 provides the method of any one of Embodiments 1-5, wherein the method further comprises obtaining or providing the curable composition, wherein the obtaining or providing of the curable composition occurs above-surface.

Embodiment 7 provides the method of any one of Embodiments 1-6, wherein the method further comprises obtaining or providing the curable composition, wherein the obtaining or providing of the curable composition occurs in the subterranean formation.

Embodiment 8 provides the method of any one of Embodiments 1-7, wherein the curing occurs at least partially above-surface.

Embodiment 9 provides the method of any one of Embodiments 1-8, wherein the curing occurs at least partially in the subterranean formation.

Embodiment 10 provides the method of any one of Embodiments 1-9, wherein the epoxy silane resin has a degradation onset of about 300° F. to about 700° F.

Embodiment 11 provides the method of any one of Embodiments 1-10, wherein the epoxy silane resin has a degradation onset of about 300° F. to about 800° F.

Embodiment 12 provides the method of any one of Embodiments 1-11, wherein the epoxy silane resin has a degradation onset of about 450° F. to about 650° F.

Embodiment 13 provides the method of any one of Embodiments 1-12, wherein the epoxy silane resin has a peak degradation temperature of about 550° F. to about 850° F.

Embodiment 14 provides the method of any one of Embodiments 1-13, wherein the epoxy silane resin has a peak degradation temperature of about 625° F. to about 765° F.

Embodiment 15 provides the method of any one of Embodiments 1-14, wherein the epoxy silane resin is substantially homogeneous.

Embodiment 16 provides the method of any one of Embodiments 1-15, wherein about 40 wt. % to about 85 wt. % of the curable composition is the epoxy silane monomer.

Embodiment 17 provides the method of any one of Embodiments 1-16, wherein about 50 wt. % to about 75 wt. % of the curable composition is the epoxy silane monomer.

Embodiment 18 provides the method of any one of Embodiments 1-17, wherein 55 wt. % to about 70 wt. % of the curable composition is the epoxy silane monomer.

Embodiment 19 provides the method of any one of Embodiments 1-18, wherein the epoxy silane monomer has the structure:

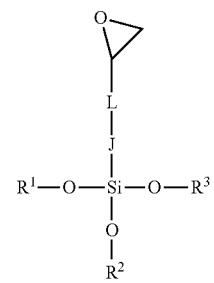

wherein
at each occurrence, $R^1$ and $R^2$ are each independently chosen from —H and substituted or unsubstituted ($C_1$-$C_{10}$)hydrocarbyl;
$R^3$ is independently selected from —H, substituted or unsubstituted ($C_1$-$C_{10}$)hydrocarbyl, and the structure:

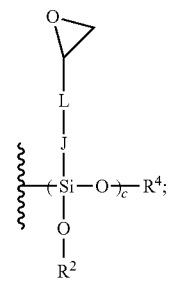

$R^4$ is independently chosen from —H and substituted or unsubstituted ($C_1$-$C_{10}$)hydrocarbyl;
at each occurrence, J is independently selected from a bond and substituted or unsubstituted ($C_1$-$C_5$)hydrocarbylene;
at each occurrence, L is independently chosen from substituted or unsubstituted ($C_1$-$C_{10}$)hydrocarbylene interrupted or terminated by 0, 1, 2, or 3 groups independently chosen from —O— and —S—; and
c is about 0 to about 10.

Embodiment 20 provides the method of Embodiments 19, wherein at each occurrence, $R^1$ and $R^2$ are each independently chosen from —H and ($C_1$-$C_{10}$)alkyl.

Embodiment 21 provides the method of any one of Embodiments 19-20, wherein at each occurrence, $R^1$ and $R^2$ are each independently chosen from —H and $(C_1-C_5)$alkyl.

Embodiment 22 provides the method of any one of Embodiments 19-21, wherein at each occurrence, $R^1$ and $R^2$ are each independently chosen from —H and methyl.

Embodiment 23 provides the method of any one of Embodiments 19-22, wherein $R^3$ is independently selected from —H and $(C_1-C_{10})$alkyl.

Embodiment 24 provides the method of any one of Embodiments 19-23, wherein $R^3$ is independently selected from —H and methyl.

Embodiment 25 provides the method of any one of Embodiments 19-24, wherein $R^4$ is independently chosen from —H and $(C_1-C_{10})$alkyl.

Embodiment 26 provides the method of any one of Embodiments 19-25, wherein $R^4$ is independently chosen from —H and $(C_1-C_5)$alkyl.

Embodiment 27 provides the method of any one of Embodiments 19-26, wherein $R^4$ is independently chosen from —H and methyl.

Embodiment 28 provides the method of any one of Embodiments 19-27, wherein at each occurrence J is independently chosen from a bond and a $(C_1-C_5)$alkylene.

Embodiment 29 provides the method of any one of Embodiments 19-24, wherein at each occurrence J is propylene.

Embodiment 30 provides the method of any one of Embodiments 19-29, wherein at each occurrence J is a bond.

Embodiment 31 provides the method of any one of Embodiments 19-30, wherein at each occurrence L is independently chosen from a substituted or unsubstituted $(C_1-C_{10})$hydrocarbylene interrupted or terminated by 0, 1, 2, or 3 groups independently chosen from —O— and —S—.

Embodiment 32 provides the method of any one of Embodiments 19-31, wherein at each occurrence L is independently chosen from, $(C_1-C_5)$alkylene, —OCH$_2$(CH$_2$)$_3$CH$_2$—, —OCH$_2$(CH$_2$)$_2$CH$_2$—, —OCH$_2$CH$_2$CH$_2$—, —OCH$_2$CH$_2$—, and —OCH$_2$—.

Embodiment 33 provides the method of any one of Embodiments 19-32, wherein at each occurrence L is independently chosen from —OCH$_2$(CH$_2$)$_3$CH$_2$—, —OCH$_2$(CH$_2$)$_2$CH$_2$—, —OCH$_2$CH$_2$CH$_2$—, —OCH$_2$CH$_2$—, and —OCH$_2$—.

Embodiment 34 provides the method of any one of Embodiments 19-33, wherein at each occurrence L is —OCH$_2$—.

Embodiment 35 provides the method of any one of Embodiments 19-34, wherein c is about 0 to about 3.

Embodiment 36 provides the method of any one of Embodiments 19-35, wherein $R^3$ at each occurrence independently has the structure:

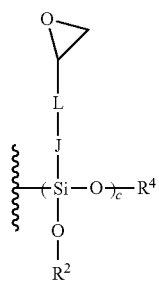

wherein
at each occurrence, $R^2$ is independently chosen from —H and $(C_1-C_{10})$alkyl;
$R^4$ is independently chosen from —H and $(C_1-C_{10})$alkyl;
at each occurrence, J is independently chosen from a bond and a $(C_1-C_5)$alkylene;
at each occurrence, L is independently chosen from —OCH$_2$(CH$_2$)$_3$CH$_2$—, —OCH$_2$(CH$_2$)$_2$CH$_2$—, —OCH$_2$CH$_2$CH$_2$—, —OCH$_2$CH$_2$—, and —OCH$_2$—; and
c is about 0 to about 5.

Embodiment 37 provides the method of any one of Embodiments 19-36, wherein $R^3$ at each occurrence independently has the structure:

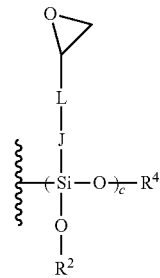

wherein
at each occurrence, $R^2$ is independently chosen from —H and methyl;
$R^4$ is independently chosen from —H and methyl;
at each occurrence, J is —CH$_2$CH$_2$H$_2$—;
at each occurrence, L is —OCH$_2$—; and
c is about 0 to about 3.

Embodiment 38 provides the method of any one of Embodiments 19-37, wherein the epoxy silane monomer has a structure chosen from

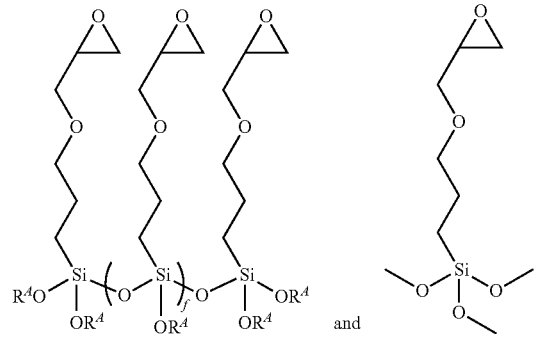

wherein
f is about 0 to about 6, and
at each occurrence $R^A$ is independently chosen from —H and —CH$_3$ and wherein the ratio of —H to —CH$_3$ is about 1 to 3 to about 3 to 1.

Embodiment 39 provides the method of any one of Embodiments 1-38, wherein about 5 wt. % to about 50 wt. % of the curable composition is the hardener.

Embodiment 40 provides the method of any one of Embodiments 1-39, wherein about 15 wt. % to about 35 wt. % of the curable composition is the hardener.

Embodiment 41 provides the method of any one of Embodiments 1-40, wherein the hardener comprises at least one primary or secondary amine.

Embodiment 42 provides the method of any one of Embodiments 1-41, wherein the hardener comprises at least one of an amine, an aromatic amine, an aliphatic amine, a cyclo-aliphatic amine, a polyamine, an amide, and a polyamide.

Embodiment 43 provides the method of any one of Embodiments 1-42, wherein the hardener has the structure:

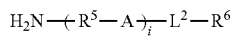

wherein
at each occurrence, $R^5$ is independently chosen from substituted or unsubstituted $(C_1$-$C_{10})$hydrocarbylene;
at each occurrence, A is independently chosen from —O—, and —NH—;
$L^2$ is independently chosen from a substituted or unsubstituted $(C_1$-$C_{10})$hydrocarbylene;
$R^6$ is independently chosen from —$NH_2$, —$Si(OR^7)_3$, and —OH, wherein at each occurrence, $R^7$ is independently chosen from a $(C_1$-$C_5)$hydrocarbyl; and
i is about 1 to about 80.

Embodiment 44 provides the method of Embodiment 43, wherein at each occurrence $R^5$ is independently chosen from $(C_1$-$C_5)$alkylene.

Embodiment 45 provides the method of any one of Embodiments 43-44, wherein at each occurrence $R^5$ is independently chosen from —$(CH_2)_2$— and —$CH(CH_3)CH_2$—.

Embodiment 46 provides the method of any one of Embodiments 43-45, wherein at each occurrence $L^2$ is independently chosen from a substituted or unsubstituted $(C_1$-$C_{10})$hydrocarbylene.

Embodiment 47 provides the method of any one of Embodiments 43-46, wherein at each occurrence $L^2$ is independently chosen from —$CH_2CH(CH_3)$— and —$(CH_2)_3$—.

Embodiment 48 provides the method of any one of Embodiments 43-47, wherein at each occurrence $R^6$ is independently chosen from —$Si(OR^7)_3$, wherein at each occurrence $R^7$ is independently chosen from —$CH_3$, —$CH_2CH_3$, and —$(CH_2)_2CH_3$.

Embodiment 49 provides the method of any one of Embodiments 43-48, wherein at each occurrence $R^6$ is —$Si(OCH_3)_3$.

Embodiment 50 provides the method of any one of Embodiments 43-49, wherein i is about 1 to about 75.

Embodiment 51 provides the method of any one of Embodiments 1-50, wherein the hardener has a structure chosen from

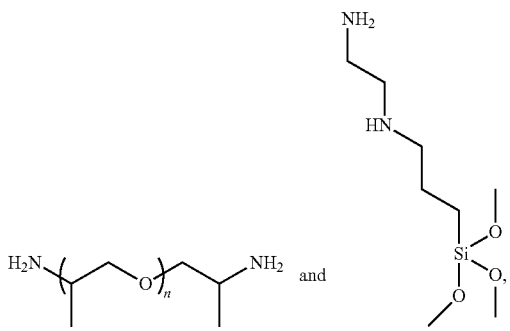

wherein n is about 1 to about 80.

Embodiment 52 provides the method of Embodiment 51, wherein n is chosen from about 65 to about 75, about 28 to about 38, and about 4 to about 8.

Embodiment 53 provides the method of any one of Embodiments 43-48, wherein n is chosen from about 1 to about 3.

Embodiment 54 provides the method of any one of Embodiments 1-47, wherein the hardener comprises

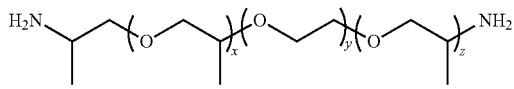

wherein,
y is about 1 to about 45; and
x+z is about 1 to about 10.

Embodiment 55 provides the method of any one of Embodiments 43-48, wherein
y is about 1 to about 10; and
x+z is about 1 to about 5.

Embodiment 56 provides the method of any one of Embodiments 1-55, wherein the curable composition further comprises a silane coupling agent.

Embodiment 57 provides the method of any one of Embodiments 1-56, further comprising combining the curable composition with an aqueous or oil-based fluid comprising a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof, to form a mixture, wherein the placing the curable composition in the subterranean formation comprises placing the mixture in the subterranean formation.

Embodiment 58 provides the method of any one of Embodiments 1-57, wherein at least one of prior to, during, and after the placing of the curable composition in the subterranean formation, the curable composition is used in the subterranean formation, at least one of alone and in combination with other materials, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof.

Embodiment 59 provides the method of any one of Embodiments 1-58, wherein the curable composition further comprises saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 60 provides the method of any one of Embodiments 1-59, wherein the placing of the curable composition in the subterranean formation comprises fracturing at least part of the subterranean formation to form at least one subterranean fracture.

Embodiment 61 provides the method of any one of Embodiments 1-60, wherein the curable composition further comprises a proppant, an epoxy silane resin-coated proppant, or a combination thereof.

Embodiment 62 provides the method of any one of Embodiments 1-61, wherein the placing of the curable composition in the subterranean formation comprises pumping the curable composition through a tubular disposed in a wellbore and into the subterranean formation.

Embodiment 63 provides a system for performing the method of any one of Embodiments 1-62, the system comprising:
a tubular disposed in the subterranean formation; and
a pump configured to pump the curable composition in the subterranean formation through the tubular.

Embodiment 64 provides a method of treating a subterranean formation, the method comprising:
placing in a subterranean formation an curable composition comprising
an epoxy silane monomer having a structure chosen from

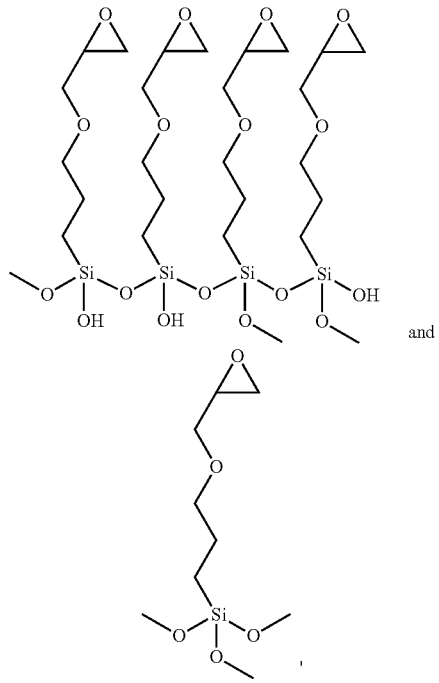

and

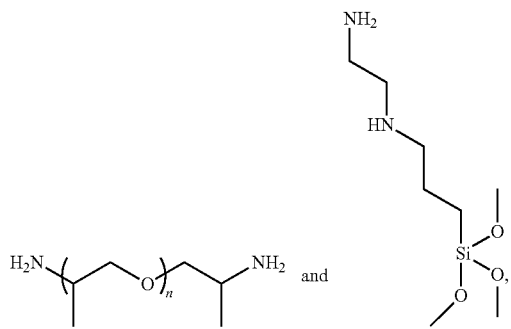

wherein about 40 wt. % to about 80 wt. % of the curable composition is the epoxy silane monomer;
a hardener having a structure chosen from wherein n is about 1 to about 5,
wherein about 5 wt. % to about 50 wt. % of the curable composition is the hardener; and
a carrier fluid comprising water, wherein the carrier fluid is about 1 wt. % to about 40 wt. % of the curable composition;
curing the curable composition to form an epoxy silane resin.

Embodiment 65 provides a method of treating a subterranean formation, the method comprising:
placing in a subterranean formation a curable composition comprising
an epoxy monomer;
an amine silane hardener; and
a carrier fluid; and
curing the curable composition to form an epoxy silane resin.

Embodiment 66 provides the method of Embodiment 65, wherein the epoxy monomer has a structure chosen from:

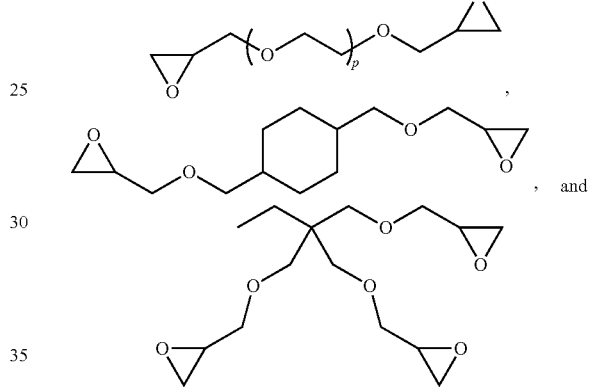

, and wherein p is about 1 to about 200.

Embodiment 67 provides the method of any one of Embodiments 65-66, wherein the amine silane hardener has the structure:

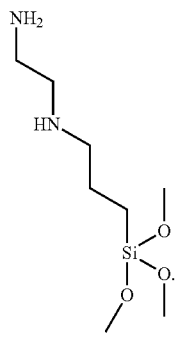

Embodiment 68 provides the method of any one of Embodiments 65-67, wherein the carrier fluid comprises water.

Embodiment 69 provides a method of treating a subterranean formation, the method comprising:
placing in a subterranean formation a curable composition comprising
an epoxy monomer, wherein about 50 wt. % to about 70 wt. % of the curable composition is the epoxy monomer;

an amine silane hardener having the structure

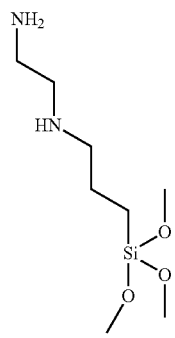

wherein about 20 wt. % to about 40 wt. % of the curable composition is the amine silane hardener; and a carrier fluid comprising water, wherein the carrier fluid is about 1 wt. % to about 40 wt. % of the curable composition, and curing the curable composition to form an epoxy silane resin.

Embodiment 70 provides a system comprising:

an epoxy silane resin cured reaction product of a curable composition comprising an epoxy silane monomer, a hardener, and a carrier fluid, and a subterranean formation comprising the resin therein.

Embodiment 71 provides the system of Embodiment 70, further comprising a tubular disposed in the subterranean formation; and a pump configured to pump the curable composition in the subterranean formation through the tubular.

Embodiment 72 provides a system comprising:

an epoxy silane resin cured reaction product of a curable composition comprising:

an epoxy monomer, an amine silane hardener, and a carrier fluid; and a subterranean formation comprising the resin therein.

Embodiment 73 provides a composition for treatment of a subterranean formation, the curable composition comprising:

an epoxy silane monomer;

a hardener; and a carrier fluid.

Embodiment 74 provides the composition of Embodiment 73, wherein the curable composition further comprises a downhole fluid.

Embodiment 75 provides the curable composition of any one of Embodiments 73-74, wherein the curable composition is a composition for at least one of remediating and consolidating a subterranean formation.

Embodiment 76 provides an epoxy silane resin cured reaction product of the curable composition of any one of Embodiments 73-75, Embodiment 77 provides a curable composition for treatment of a subterranean formation, the curable composition comprising:

an epoxy silane monomer selected from

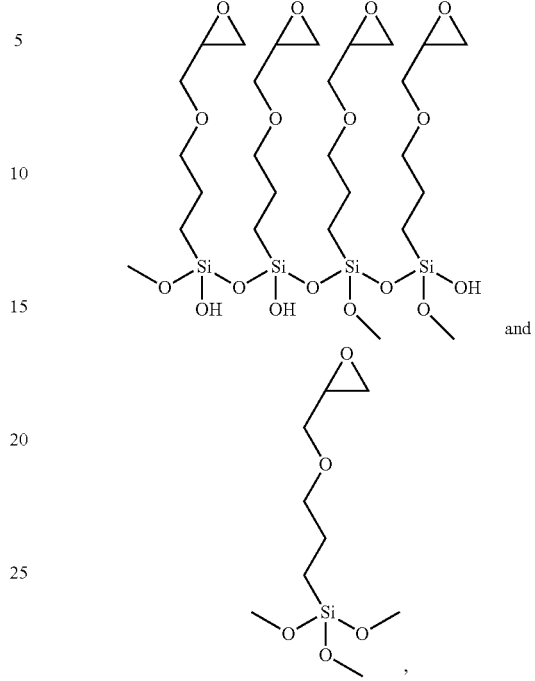

wherein about 55 wt. % to about 70 wt. % of the curable composition is the epoxy silane monomer a hardener selected from

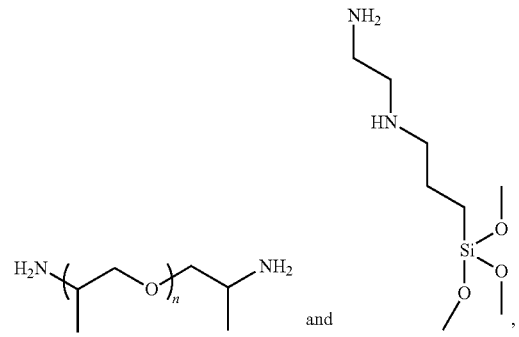

wherein n is about 1 to about 4, wherein about 15 wt. % to about 35 wt. % of the curable composition is the hardener and a carrier fluid comprising water, wherein about 5 wt. % to about 25 wt. % of the curable composition is the carrier fluid.

Embodiment 78 provides a curable composition for treatment of a subterranean formation, the curable composition comprising:

an epoxy monomer;

an amine silane hardener; and a carrier fluid.

Embodiment 79 provides the curable composition of Embodiment 78, wherein the curable composition comprises:

an epoxy monomer having a structure chosen from

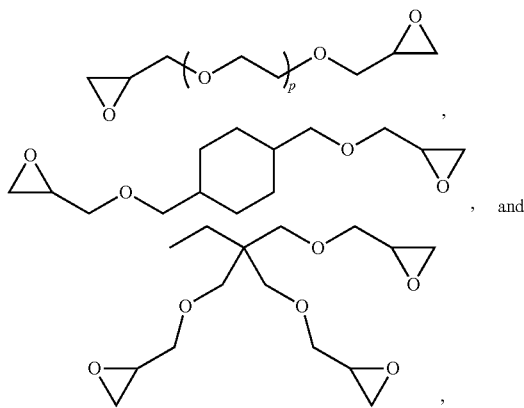

wherein p is about 1 to about 200,
wherein about 55 wt. % to about 70 wt. % of the curable composition is the epoxy monomer;
an amine silane hardener having the structure

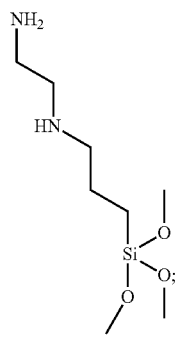

and
a carrier fluid comprising water, wherein about 5 wt. % to about 25 wt. % of the curable composition is the carrier fluid.

Embodiment 80 provides a method of preparing a curable composition for treatment of a subterranean formation, the method comprising:
forming a curable composition comprising
an epoxy silane monomer;
a hardener; and
a carrier fluid.

Embodiment 81 provides a method of preparing a curable composition for treatment of a subterranean formation, the method comprising: forming a curable composition comprising
an epoxy monomer;
an amine silane hardener; and
a carrier fluid.

Embodiment 82 provides the composition, method, or system of any one or any combination of Embodiments 1-81 optionally configured such that all elements or options recited are available to use or select from.

What is claimed is:
1. A curable composition for treatment of a subterranean formation, the curable composition comprising:
an epoxy monomer and a hardener, wherein the epoxy monomer is an epoxy silane monomer configured to be curable by the hardener; and
a carrier fluid,
wherein the epoxy monomer is an epoxy silane monomer selected from

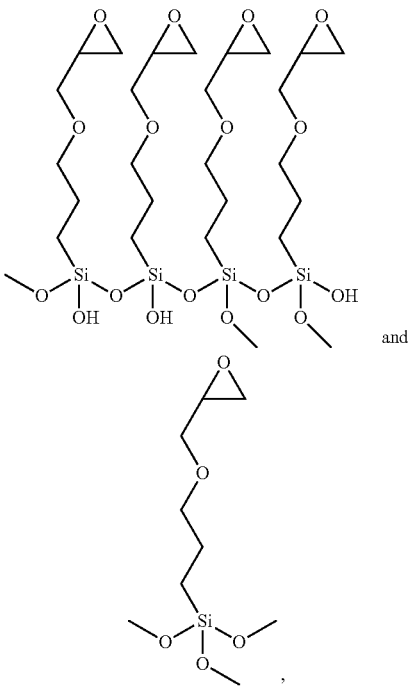

wherein about 55 wt. % to about 70 wt. % of the curable composition is the epoxy silane monomer;
wherein the hardener is

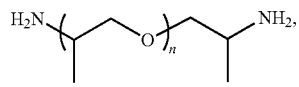

wherein n is about 1 to about 4,
wherein about 15 wt. % to about 35 wt. % of the curable composition is the hardener; and
wherein the carrier fluid comprises water, wherein about 5 wt. % to about 25 wt. % of the curable composition is the carrier fluid.

2. The curable composition of claim 1, wherein the curable composition further comprises a downhole fluid.

3. The curable composition of claim 1, wherein the curable composition is a composition for at least one of remediating and consolidating a subterranean formation.

4. The curable composition of claim 1, wherein the curable composition is a composition for at least one of cementing and plugging a subterranean formation.

5. An epoxy silane resin cured reaction product of the curable composition of claim 1.

6. The epoxy silane resin cured reaction product of claim 5, wherein the epoxy silane resin cured product is adhered to a casing disposed in the subterranean formation.

7. The curable composition of claim 1, wherein an epoxy silane resin reaction product of the curable composition is effective for adhering to a casing disposed in the subterranean formation, thereby cementing or plugging the subterranean formation.

8. The curable composition of claim 1, wherein the carrier fluid comprises water including at least one of fresh water, brine, produced water, flowback water, brackish water, and sea water.

9. The curable composition of claim 1, wherein the carrier fluid comprises crude oil, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester, tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction mineral oil, a hydrocarbon oil, a hydrocarbon including an aromatic carbon-carbon bond, a hydrocarbon including an alpha olefin, xylenes, an ionic liquid, methyl ethyl ketone, an ester of oxalic, maleic or succinic acid, methanol, ethanol, propanol, butyl alcohol, an aliphatic hydrocarbon, or a combination thereof.

10. The curable composition of claim 1, wherein an epoxy silane resin reaction product of the curable composition comprises reduced or eliminated segregation of epoxy and silane domains, increasing homogeneity and temperature stability of the epoxy silane resin reaction product.

11. The curable composition of claim 1, wherein an epoxy silane resin reaction product of the curable composition comprises a degradation onset between about 300° F. and about 800° F.

12. The curable composition of claim 1, wherein an epoxy silane resin reaction product of the curable composition comprises a peak degradation temperature between about 550° F. and about 850° F.

13. The curable composition of claim 1, wherein an epoxy silane resin reaction product of the curable composition comprises a ratio of epoxy functional groups to silane functional groups less than about 1 to 1000.

14. The curable composition of claim 1, further comprising filler particles comprising aluminum oxide, awaruite, barium carbonate, barium oxide, barite, calcium carbonate, calcium oxide, cenospheres, chromite, chromium oxide, copper, copper oxide, dolomite, galena, hematite, hollow glass microspheres, ilmenite, iron oxide, siderite, magnetite, magnesium oxide, manganese carbonate, manganese dioxide, manganese (IV) oxide, manganese oxide, manganese tetraoxide, manganese (II) oxide, manganese (III) oxide, molybdenum (IV) oxide, molybdenum oxide, molybdenum trioxide, Portland cement, pumice, pyrite, spherelite, silica, silver, tenorite, titania, titanium (II) oxide, titanium (III) oxide, titanium (IV) dioxide, zirconium oxide, zirconium silicate, zinc oxide, cement-kiln dust, unexpanded and expanded perlite, attapulgite, bentonite, zeolite, elastomers, sand, micronized polymers, waxes, polymer fibers, inorganic fibers, and a combination thereof.

15. The curable composition of claim 1, further comprising a silane coupling agent comprising a ($C_1$-$C_{30}$)hydrocarbyl-substituted trimethoxysilane, N-2-(aminoethyl)-3-aminopropyltrimethoxysilane, 3-glycidoxypropyltrimethoxysilane, n-beta-(aminoethyl)-gamma-aminopropyltrimethoxysilane, or a combination thereof.

16. The curable composition of claim 1, further comprising a breaker to at least partially break a fluid surrounding the curable composition.

17. The curable composition of claim 1, further comprising a viscosifier to increase a viscosity of the curable composition.

18. The curable composition of claim 1, further comprising a proppant, an epoxy silane resin-coated proppant, resin-coated proppant, an encapsulated epoxy silane resin, or a combination thereof.

* * * * *